US012671912B2

(12) United States Patent
Choi et al.

(10) Patent No.: US 12,671,912 B2
(45) Date of Patent: Jun. 30, 2026

(54) IMAGE SENSOR INCLUDING COLOR SEPARATING LENS ARRAY

(71) Applicant: SAMSUNG ELECTRONICS CO., LTD., Suwon-si (KR)

(72) Inventors: Chulsoo Choi, Suwon-si (KR); Bumsuk Kim, Suwon-si (KR); Junghun Kim, Suwon-si (KR); Jonghoon Park, Suwon-si (KR); Yunki Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/771,526

(22) Filed: Jul. 12, 2024

(65) Prior Publication Data

US 2025/0024164 A1 Jan. 16, 2025

(30) Foreign Application Priority Data

Jul. 14, 2023 (KR) ........................ 10-2023-0092031

(51) Int. Cl.
H04N 25/13 (2023.01)
H04N 23/55 (2023.01)
(52) U.S. Cl.
CPC ........... H04N 25/134 (2023.01); H04N 23/55 (2023.01)
(58) Field of Classification Search
CPC .... H04N 25/134; H04N 23/55; H10F 39/806; H10F 39/802; H10F 39/8053; B82Y 20/00
See application file for complete search history.

(56) References Cited

U.S. PATENT DOCUMENTS

| | | | |
|---|---|---|---|
| 11,211,418 B2 | 12/2021 | Arbabi et al. | |
| 11,353,626 B2 | 6/2022 | You et al. | |
| 11,469,265 B2 | 10/2022 | Arbabi et al. | |
| 2016/0156883 A1* | 6/2016 | Han | H10F 39/806 |
| | | | 348/360 |
| 2017/0034500 A1* | 2/2017 | Arbabi | H10F 39/8063 |
| 2017/0077163 A1* | 3/2017 | Chou | H04N 23/672 |
| 2021/0014394 A1* | 1/2021 | Han | G02B 5/286 |
| 2021/0118932 A1* | 4/2021 | Cho | H10F 39/182 |
| 2021/0120198 A1* | 4/2021 | Kim | H10F 39/8053 |
| 2021/0124179 A1* | 4/2021 | Yun | H10F 39/806 |
| 2021/0125301 A1* | 4/2021 | Park | G06T 1/0007 |

(Continued)

FOREIGN PATENT DOCUMENTS

KR 10-2021-0048401 A 5/2021

*Primary Examiner* — Abdelaaziz Tissire
(74) *Attorney, Agent, or Firm* — Sughrue Mion, PLLC

(57) ABSTRACT

An image sensor includes a sensor substrate including a plurality of first photosensitive cells configured to sense light and a color separating lens array in an upper portion of the sensor substrate and including a plurality of first sub regions respectively corresponding to the plurality of first photosensitive cells, where each of the plurality of first sub regions include a plurality of first nano-posts, where the plurality of first sub regions include at least one first central sub region at a center of the color separating lens array and at least one first peripheral sub region at a periphery of the color separating lens array, and where the plurality of first nano-posts include at least one first nano-post in the at least one first central sub region and at least one second nano-post in the at least one first peripheral sub region and corresponding to the at least one first nano-post.

20 Claims, 30 Drawing Sheets

(56)            References Cited

U.S. PATENT DOCUMENTS

| | | | |
|---|---|---|---|
| 2021/0126035 A1* | 4/2021 | Roh | G02B 1/002 |
| 2021/0167110 A1* | 6/2021 | Roh | H10F 39/8023 |
| 2021/0249459 A1 | 8/2021 | Yun et al. | |
| 2021/0311240 A1 | 10/2021 | Siddique et al. | |
| 2022/0141427 A1* | 5/2022 | Roh | G02B 27/123 |
| | | | 348/164 |
| 2022/0150453 A1 | 5/2022 | Lee et al. | |
| 2022/0190017 A1* | 6/2022 | Park | H10F 39/8063 |
| 2022/0208822 A1* | 6/2022 | Yun | H10F 39/8053 |
| 2022/0326415 A1 | 10/2022 | Yun et al. | |
| 2024/0170522 A1 | 5/2024 | Choi et al. | |

* cited by examiner

| Gr | R | Gr | R | Gr | R | Gr | R |
|----|---|----|---|----|---|----|---|
| B | Gb | B | Gb | B | Gb | B | Gb |
| Gr | R | Gr | R | Gr | R | Gr | R |
| B | Gb | B | Gb | B | Gb | B | Gb |
| Gr | R | Gr | R | Gr | R | Gr | R |
| B | Gb | B | Gb | B | Gb | B | Gb |
| Gr | R | Gr | R | Gr | R | Gr | R |
| B | Gb | B | Gb | B | Gb | B | Gb |

UF_a

UF_b

IMAGE SENSOR INCLUDING COLOR SEPARATING LENS ARRAY

CROSS-REFERENCE TO RELATED APPLICATION

This application is based on and claims priority under 35 U.S.C. § 119 to Korean Patent Application No. 10-2023-0092031, filed on Jul. 14, 2023, in the Korean Intellectual Property Office, the disclosure of which is incorporated herein by reference in its entirety.

BACKGROUND

Example embodiments of the disclosure relate to an image sensor including a color separating lens array with a plurality of nano-posts.

Image sensors generally sense the color of incident light using a color filter. However, since the color filter absorbs light in wavelength ranges corresponding to colors other than light in a wavelength range corresponding to the color of the incident light, light utilization efficiency of the color filter may be reduced.

Although the light utilization efficiency of the color filter may be increased using a color separating lens array including a plurality of nano-posts, as image sensors and imaging modules become smaller, a chief ray angle (CRA) tends to increase at a periphery of the color separating lens array. When the CRA increases at the periphery of the color separating lens array, since a difference between a first green pixel signal and a second green pixel signal may occur at the periphery of the color separating lens array, and further since colors at the center and periphery of the color separating lens array may be different from each other, image processing may be difficult.

Information disclosed in this Background section has already been known to or derived by the inventors before or during the process of achieving the embodiments of the present application, or is technical information acquired in the process of achieving the embodiments. Therefore, it may contain information that does not form the prior art that is already known to the public.

SUMMARY

One or more example embodiments provide an image sensor that may minimize a difference between a first green pixel signal and a second green pixel signal at a periphery of a color separating lens array and that may minimize a color difference between the center and the periphery of the color separating lens array.

One or more example embodiments further provide an image sensor including a color separating lens array capable of separately condensing incident light according to wavelengths of the incident light by adjusting cross-sectional areas, a number, and distances between the plurality of nano-posts.

Additional aspects will be set forth in part in the description which follows and, in part, will be apparent from the description, or may be learned by practice of the presented embodiments.

According to an aspect of an example embodiment, an image sensor may include a sensor substrate including a plurality of first photosensitive cells configured to sense light and a color separating lens array in an upper portion of the sensor substrate and including a plurality of first sub regions respectively corresponding to the plurality of first photosensitive cells, where the each of plurality of first sub regions include a first plurality of nano-posts, where the plurality of first sub regions include at least one first central sub region at a center of the color separating lens array and at least one first peripheral sub region at a periphery of the color separating lens array, where the first plurality of nano-posts include at least one first nano-post in the at least one first central sub region and at least one second nano-post in the at least one first peripheral sub region and corresponding to the at least one first nano-post, and where a cross-sectional area of the at least one first nano-post is different from a cross-sectional area of the at least one second nano-post.

According to an aspect of an example embodiment, an image sensor may include a sensor substrate including a plurality of photosensitive cells configured to sense light, and a color separating lens array in an upper portion of the sensor substrate and including a plurality of unit regions, where the plurality of unit regions include a first plurality of nano-posts, where the plurality of unit regions include at least one central unit region at a center of the color separating lens array and at least one peripheral unit region at a periphery of the color separating lens array, where the first plurality of nano-posts include at least two first nano-posts in the at least one central unit region and at least two second nano-posts in the at least one peripheral unit region and respectively corresponding to the at least two first nano-posts and where distances between the at least two first nano-posts are different from distances between the at least two second nano-posts.

According to an aspect of an example embodiment, an image sensor may include a sensor substrate including a plurality of photosensitive cells configured to sense light and a color separating lens array in an upper portion of the sensor substrate and including a plurality of unit regions, where each of the plurality of unit regions include M nano-posts, where the plurality of unit regions include at least one central unit region at a center of the color separating lens array, and at least one peripheral unit region at a periphery of the color separating lens array, where the M nano-posts include first N nano-posts in the at least one central unit region and second N nano-posts in the at least one peripheral unit region and respectively corresponding to the first N nano-posts, where a cross-sectional area of each of the first N nano-posts is different from a cross-sectional area of each of the second N nano-posts, where distances between at least two first nano-posts in the at least one peripheral unit region are different from distances between two second nano-posts in the at least one central unit region that respectively correspond to the at least two first nano-posts, where M is an integer of 1 or more, and where N is an integer of 1 or more and M or less.

BRIEF DESCRIPTION OF DRAWINGS

The above and other aspects, features, and advantages of certain example embodiments of the present disclosure will be more apparent from the following description taken in conjunction with the accompanying drawings, in which.

DETAILED DESCRIPTION

Figure 1:
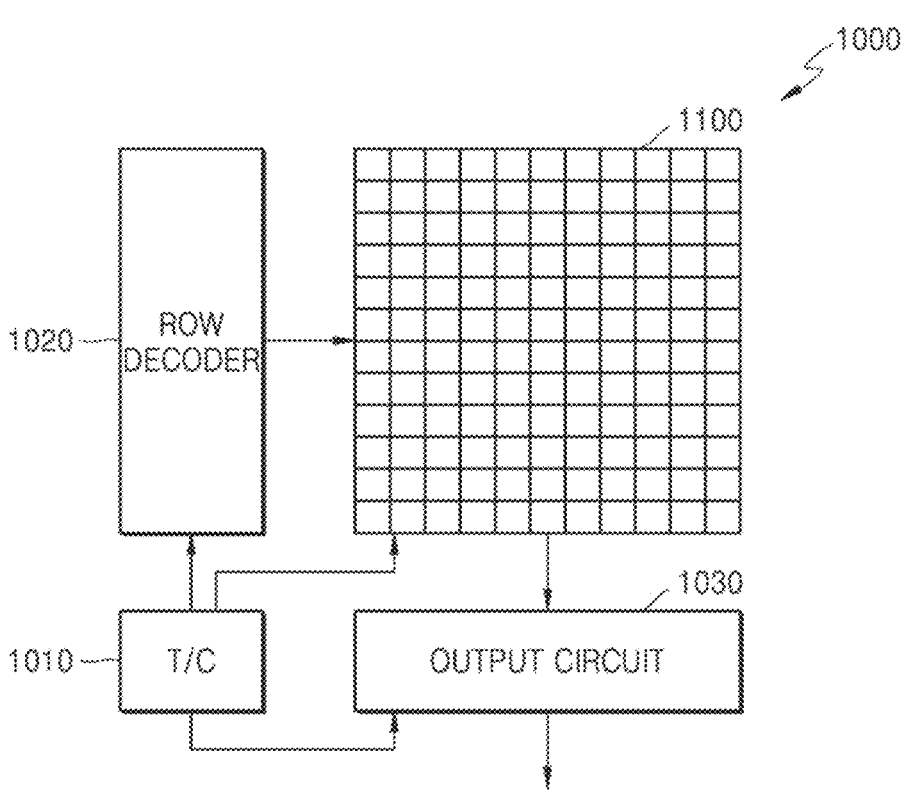
FIG. 1 is a block diagram illustrating an image sensor according to an embodiment.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present.

FIG. 1 is a block diagram illustrating an image sensor 1000 according to an embodiment.

Referring to FIG. 1, the image sensor 1000 may include a pixel array 1100, a timing controller (T/C) 1010, a row decoder 1020, and an output circuit 1030. The image sensor 1000 may be a charge coupled device (CCD) image sensor or a complementary metal oxide semiconductor (CMOS) image sensor.

The pixel array 1100 may include pixels that are two-dimensionally disposed in a plurality of rows and columns. The row decoder 1020 may select a plurality of pixels disposed in one of the rows in the pixel array 1100 in response to a row address signal output from the T/C 1010. The output circuit 1030 may output a photosensitive signal (which may be referred to as a pixel signal), in a column unit, from the selected plurality of pixels. To this end, the output circuit 1030 may include a column decoder and an analog-to-digital converter (ADC). For example, the output circuit 1030 may include a plurality of ADCs disposed respectively according to the columns between a column decoder and the pixel array 1100 or one ADC disposed at an output end of the column decoder. The T/C 1010, the row decoder 1020, and the output circuit 1030 may be implemented as one chip or in separate chips. A processor for processing image data output through the output circuit 1030 may be implemented as one chip with the T/C1010, the row decoder 1020, and the output circuit 1030.

The image sensor 1000 according to embodiments may include a color separating lens array including a plurality of nano-posts. The nano-posts will be described below with reference to FIG. 4. A cross-sectional area of at least one nano-post located at the center of the color separating lens array may be different from a cross-sectional area of at least one nano-post located at the periphery of the color separating lens array.

Here, positions of the center and periphery of the color separating lens array are relative and may not be fixed specific positions. For example, the center of the color separating lens array may not necessarily indicate the exact center of the color separating lens array. For example, one of two unit regions UR, which will be described below with reference to FIG. 7, which is relatively close to the exact center of the color separating lens array, may be referred to as a unit region located at the center of the color separating lens array, and the other unit region may be referred to as a unit region located at the periphery of the color separating lens array. For convenience of explanation, the portion of the unit region UR, which will be described below with reference to FIG. 7, that is located at the center of the color separating lens array may be referred to as a central unit region, and similarly, the portions of the unit region UR, which will be described below with reference to FIG. 7, that is located at the periphery of the color separating lens array may also be referred to as a peripheral unit region. This may also be the same for first, second, third, and fourth sub regions included in the unit region UR, which will be described below with reference to FIG. 7.

Figure 2:
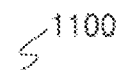
FIG. 2 is a diagram illustrating a pixel arrangement of a pixel array according to an embodiment.
Figure 2:
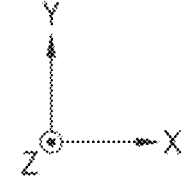

FIG. 2 is a diagram illustrating a pixel arrangement of the pixel array 1100 according to an embodiment.

FIG. 2 illustrates the pixel array 1100 in which a plurality of pixels are disposed in a Bayer pattern. Specifically, referring to FIG. 2, the Bayer pattern may refer to a pattern where a first row in which a plurality of first green pixels Gr and a plurality of red pixels R are alternately disposed in a first direction (X direction), and a second row in which a plurality of blue pixels B and a plurality of second green pixels Gb are alternately disposed in the first direction (X direction) are repeatedly disposed in a second direction (Y direction) perpendicular to the first direction (X direction).

However, the arrangement pattern of the plurality of pixels included in the pixel array 1100 is not limited to the Bayer pattern, and the plurality of pixels included in the pixel array 1100 may be disposed in various patterns other than the Bayer pattern. For example, the plurality of pixels included in the pixel array 1100 may be disposed in a CYGM pattern where magenta pixels, cyan pixels, yellow pixels, and green pixels disposed in a 2×2 matrix are repeated, or a RGBW pattern where green pixels, red pixels, blue pixels, and white pixels disposed in a 2×2 matrix are repeated.

Hereinafter, for convenience of explanation, it is described that the arrangement pattern of the plurality of pixels included in the pixel array 1100 is the Bayer pattern, but the disclosure is not limited thereto.

A color separating lens array may be located above the pixels disposed in the Bayer pattern in a third direction (Z direction) perpendicular to the first direction (X direction) and the second direction. The color separating lens according to embodiments may include a plurality of nano-posts, and the plurality of nano-posts may be disposed in a pattern corresponding to the Bayer pattern. That is, the plurality of nano-posts included in the color separating lens array may be disposed in a form in which similar patterns are repeated in correspondence to the Bayer pattern. For example, a first sub region (131 in FIG. 7) may correspond to the first green pixel Gr, a second sub region (132 in FIG. 7) may correspond to the red pixel R, a third sub region (133 in FIG. 7) may correspond to the blue pixel B, and a fourth sub region (134 in FIG. 7) may correspond to the second green pixel Gb. Each of the first sub region, second sub region, third sub region, and fourth sub region may include at least one nano-post disposed in a specific pattern according to the corresponding pixel, and the color separating lens array may include at least two unit regions (UR in FIG. 7) including one first sub region, one second sub region, one third sub region, and one fourth sub region which are adjacent in a 2×2 shape. However, the arrangement pattern of the plurality of nano-posts included in the color separating lens array according to embodiments may be different at the center and the periphery of the color separating lens array in consideration of a chief ray angle (CRA) of incident light (for example, since cross-sectional areas of or/and the distances between the corresponding nano-posts are different). For example, a cross-sectional area of at least one nano-post located at the center of the color separating lens array may be different from a cross-sectional area of at least one nano-post located at the periphery of the color separating lens array and corresponding to the at least one nano-post.

Figure 3:
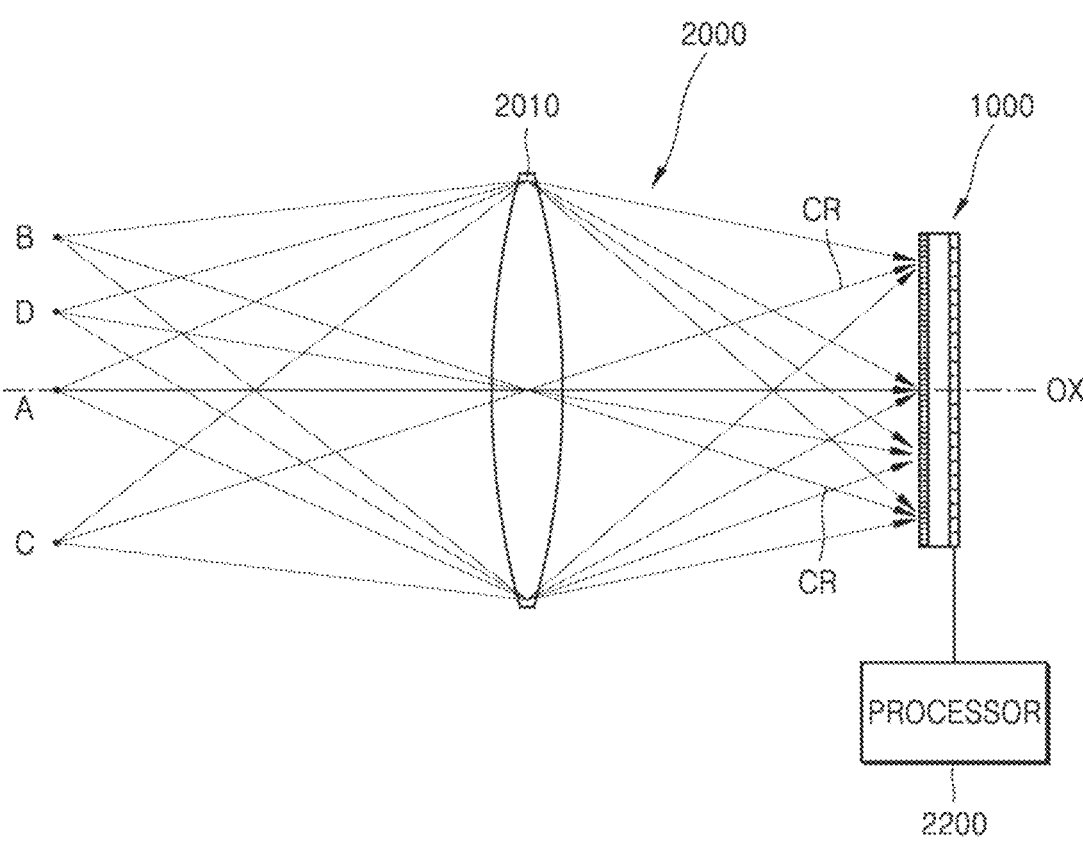
FIG. 3 is a diagram illustrating a camera according to an embodiment.

FIG. 3 is a diagram illustrating a camera 2000 according to an embodiment.

Referring to FIG. 3, the camera 2000 according to an embodiment may include an objective lens 2010 forming an optical image by focusing light reflected from an object, and an image sensor 1000 converting the optical image formed by the objective lens 2010 into an electric image signal. Since the image sensor 1000 may correspond to the image sensor 1000 of FIG. 1, a repeated description thereof may be omitted.

The camera 2000 may further include a processor 2200 that processes the electrical image signal output from the image sensor 1000. The processor 2200 may form an image by performing operations such as noise removal and color interpolation on signals according to colors output from the image sensor 1000. For example, the signals according to colors may refer to a first green pixel signal output from the first green pixel (Gr in FIG. 2), a red pixel signal output from the red pixel (R in FIG. 2), a blue pixel signal output from the blue pixel (B in FIG. 2), and a second green pixel signal output from the second green pixel (Gb in FIG. 2).

The camera 2000 may further include an infrared blocking filter disposed between the image sensor 1000 and the objective lens 2010, a display panel that displays an image formed by the processor 2200, and a memory storing image data formed by the processor 2200. The camera 2000 may be mounted, for example, in a mobile electronic device such as a cell phone, a laptop, a tablet personal computer (PC), etc.

The objective lens 2010 may serve to focus an image of a subject outside the camera 2000 onto the image sensor 1000. When the image sensor 1000 is exactly located on a focal plane of the objective lens 2010, light starting from a point on the subject is re-converged to a point on the image sensor 1000 through the objective lens 2010. For example, light starting from a point A on an optical axis OX passes through the objective lens 2010 and then is collected at the center of the image sensor 1000 on the optical axis OX. Light starting from a point B, C, or D off the optical axis OX crosses the optical axis OX by the objective lens 2010 and is collected at a point on the periphery of the image sensor 1000. For example, in FIG. 2, light starting from the point B above the optical axis OX crosses the optical axis OX and is collected at a lower periphery of the image sensor 1000, and light starting from the point C below the optical axis OX crosses the optical axis OX and is collected at an upper periphery of the image sensor 1000. In addition, light starting from the point D located between the optical axis OX and the point B is collected between the center and the lower periphery of the image sensor 1000.

Therefore, the lights departing from the different points A, B, C and D are incident on the image sensor 1000 at different angles according to distances between the points A, B, C and D and the optical axis OX. An incidence angle of light incident on the image sensor 1000 is usually defined as a CRA. A chief ray (CR) is a ray incident on the image sensor 1000 from one point of a subject through the center of the objective lens 2010. The CRA is an angle formed by the CR with the optical axis OX. The light starting from the point A on the optical axis OX has the CRA of 0 degrees and is incident perpendicularly on the image sensor 1000. As the starting point moves away from the optical axis OX, the CRA increases.

As described above, the CRA of the light incident on the center of the image sensor 1000 may be 0 degrees, and the CRA of the incident light may increase toward the periphery of the image sensor 1000. For example, the CRA of the light starting from the point B and the point C and incident on the periphery of the image sensor 1000 is the largest, and the CRA of the light starting from the point A and incident on the center of the image sensor 1000 is 0 degrees. In addition, the CRA of the light starting from the point D and incident between the center and the periphery of the image sensor 1000 is smaller than the CRA of the light starting from the point B and the point C and is greater than 0 degrees.

The color separating lens array including the plurality of nano-posts described with reference to the image sensor 1000 of FIG. 1 may generally have directionality. In other words, the color separating lens array operates efficiently with respect to light incident at a specific angle range, but when the incident angle moves away from the specific angle range, the color separation performance of the color separating lens array may deteriorate. Therefore, when the nano-posts of the color separating lens array all have the same arrangement form in the entire area of the image sensor 1000, without considering the CRA, the color separation efficiency is not uniform in the entire area of the image sensor 1000 and varies depending on the area of the image sensor 1000. As a result, the quality of the image provided by the camera 2000 may deteriorate.

As described above, the CRA of the incident light at the center of the color separating lens array may be 0 degrees or relatively small, but the CRA may increase away from the center of the color separating lens array (i.e., from the center to the periphery of the color separating lens array). Therefore, considering the CRA of the incident light that varies depending on the position on the image sensor 1000 (that is, the position on the color separating lens array), the arrangement form of the nano-posts of the color separating lens array (the cross-sectional area of the nano-post and/or the distances between adjacent nano-posts) may be designed differently.

As described above with reference to FIG. 2, the plurality of nano-posts included in the color separating lens array may be disposed in a form in which similar patterns are repeated in correspondence to the Bayer pattern. The patterns repeated on the color separating lens array may include a first pattern corresponding to the first green pixel (Gr in FIG. 2), a second pattern corresponding to the red pixel (R in FIG. 2), a third pattern corresponding to the blue pixel (B in FIG. 2), and a fourth pattern corresponding to the second green pixel (Gb in FIG. 2). The first pattern may be adjacent to two second patterns in a first direction, and may be adjacent to two third patterns in a second direction perpendicular to the first direction. On the other hand, the fourth pattern may be adjacent to two third patterns in the first direction and may be adjacent to two second patterns in the second direction perpendicular to the first direction. Therefore, although light condensed in the first green pixel (Gr in FIG. 2) corresponding to the first pattern and light condensed in the second green pixel (Gb in FIG. 2) corresponding to the fourth pattern are both green light, the first pattern and the fourth pattern may be different from each other, and the patterns adjacent to each of the first pattern and the fourth pattern may be different according to the first direction and the second direction. For this reason, when the CRA increases, the intensity of the green light condensed in the first green pixel (Gr in FIG. 2) may be different from the intensity of the green light condensed in the second green pixel (Gb in FIG. 2). Accordingly, the intensity of a first green pixel signal and the intensity of a second green pixel signal respectively generated based on the first green pixel (Gr in FIG. 2) and the second green pixel (Gb in FIG. 2) may be different from each other.

In other words, the intensity of the first green pixel signal and the intensity of the second green pixel signal may be different from each other at the periphery of the color separating lens array, and in this case, an additional operation of correcting the intensity may be performed. Thus, power consumption may increase, and the quality of the image generated by the image sensor 1000 may deteriorate. Furthermore, due to the difference between the first and fourth patterns and the difference in the CRA described above, a wavelength range of each of the light condensed by the center of the color separating lens array and the light condensed by the peripheral portion may be partially different, and accordingly, colors of the image generated by the image sensor 1000 may be different in the center and the periphery of the color separating lens array. For example, the color of the image corresponding to the center of the color separating lens array may be red, and the color of the image corresponding to the periphery thereof may be green. In other words, when comparing the center of the image to the periphery of the image, the overall color may be closer to red.

According to embodiments, cross-sectional areas of one or more nano-posts located at the center of the color separating lens array and cross-sectional areas of nano-posts located at the periphery thereof and corresponding thereto are different, or distances between other adjacent nano-posts are different, and thus, the above-described problem may be reduced or prevented.

Hereinafter, for convenience, the center of the color separating lens array is used. However, since the image sensor 1000, the pixel array 1100 in FIG. 1, and the color separating lens array are disposed in the third direction (Z direction in FIG. 2), the center of the color separating lens array may refer to the center of the image sensor 1000 and the center of the pixel array 1100 in FIG. 1. Similarly, hereinafter, the periphery of the color separating lens array may refer to the periphery of the image sensor 1000 and the periphery of the pixel array 1100 in FIG. 1.

Figure 4:
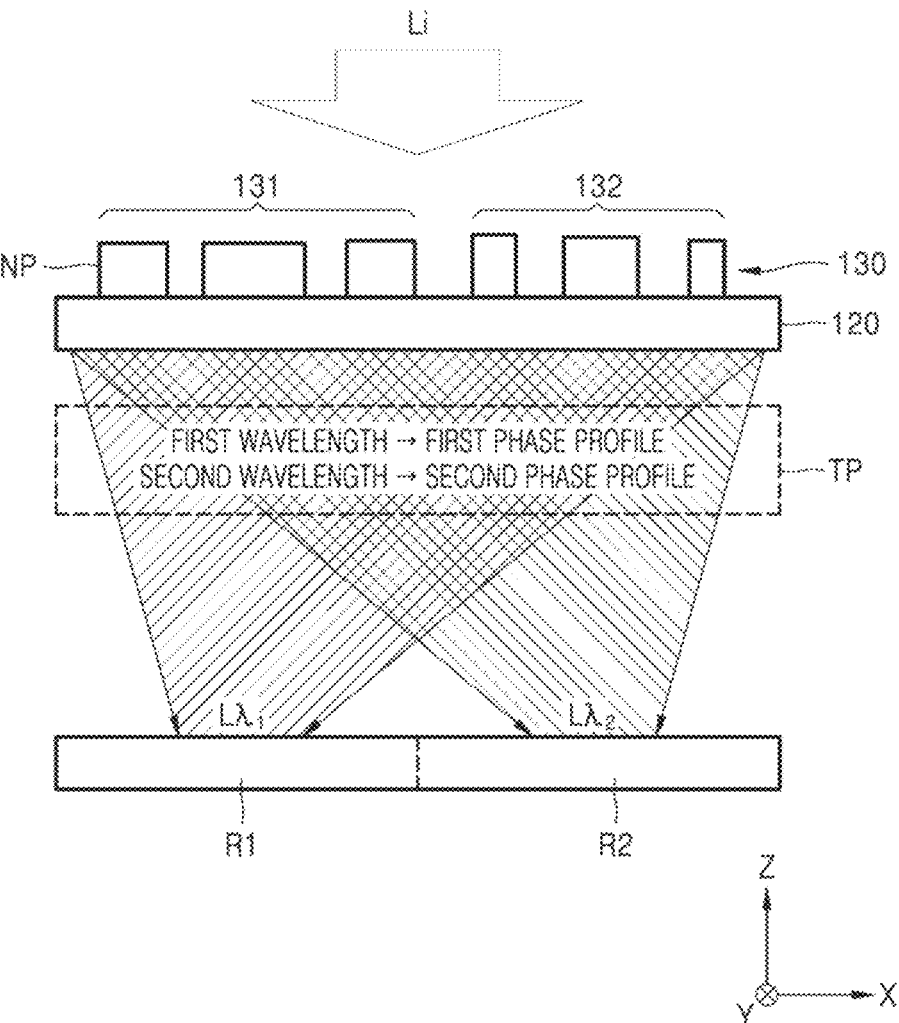
FIG. 4 is a diagram illustrating a schematic structure and operation of a color separating lens array according to an embodiment.

FIG. 4 is a diagram illustrating the schematic structure and operation of a color separating lens array 130.

The color separating lens array 130 may include nano-posts NP disposed on the same plane according to a predefined rule. The color separating lens array 130 may be disposed on a spacer layer 120.

The rule may be applied to parameters, such as a shape, a size (width, height), a distance, and an arrangement form of the nano-posts NP, and may be determined according to a target phase profile TP that the color separating lens array 130 intends to implement with respect to an incident light Li. The target phase profile TP may be determined by separating a wavelength of the incident light Li and considering first and second target regions R1 and R2 to be condensed. The target phase profile TP is indicated between the color separating lens array 130 and the first and second target regions R1 and R2, but this is only for convenience of illustration. The actual target phase profile TP refers to a phase profile at a position immediately after the incident light Li passes through the color separating lens array 130 (for example, a lower surface of the color separating lens array 130 or an upper surface of the spacer layer 120).

The color separating lens array 130 may include a first sub region 131 and a second sub region 132 each having at least one nano-post NP configured based on different rules. For example, the first sub region 131 and the second sub region 132 may each include one or a plurality of nano-posts NPs. The first sub region 131 and the second sub region 132 may be respectively disposed to face and may have a one-to-one correspondence with the first target region R1 and the second target region R2. Three nano-posts NP may be disposed in each of the first sub region 131 and the second sub region 132, but this is an example. In addition, the nano-post NP may be entirely located within one of the first sub region 131 and the second sub region 132, but is not limited thereto, and some nano-posts NP may be disposed at the boundary between the first sub region 131 and the second sub region 132.

The nano-posts NP of the color separating lens array 130 may form a phase profile that diverges light of different wavelengths included in the incident light Li in different directions and condenses the diverged light. For example, the shapes, size, arrangement, etc. of the nano-posts NP distributed in the first sub region 131 and the second sub region 132 may be determined so as to form the target phase profile TP in which a light L$\lambda$1 of a first wavelength included in the incident light Li has a first phase profile, and a light L$\lambda$2 of a second wavelength has a second phase profile. According to the target phase profile TP, the light L$\lambda$1 of the first wavelength and the light L$\lambda$2 of the second wavelength may be respectively condensed on the first and second target regions R1 and R2 at a predetermined distance from an array of the nano-posts NP.

The spacer layer 120 may support the color separating lens array 130, serve to maintain a constant distance between a sensor substrate (110 in FIG. 5A) and the color separating lens array 130, and include a material transparent to visible light. For example, the spacer layer 120 may include a dielectric material (e.g., SiO$_2$, siloxane-based spin on glass (SOG), etc.) having a lower refractive index than that of the nanoposts NP of the color separating lens array 130 and low absorption coefficient in a visible ray band.

The nano-posts NP may be disposed in the first sub region 131 and the second sub region 132 according to different rules. In other words, any one of the shapes, sizes, and arrangement of the nano-posts NP provided in the first sub region 131 may be different from the shapes, sizes, and arrangement of the nano-posts NP provided in the second sub region 132.

The nano-posts NP may have a shape dimension of a sub-wavelength less than a wavelength band to be branched. The nano-posts NP may have a shape dimension less than the shorter of a first wavelength or a second wavelength, and, when the incident light Li is visible light, may have a dimension less than 400 nm, 300 nm, or 200 nm.

The nano-posts NP may include a material having a higher refractive index than a refractive index of a peripheral material. For example, the nano-posts NP may include c-Si, p-Si, a-Si and a Group III-V compound semiconductor (GaP, GaN, GaAs, etc.), SiC, TiO$_2$, SiN, and/or a combination thereof. The nano-posts NP having a different refractive index from the refractive index of the peripheral material may change the phase of light that passes therethrough. This is caused by phase delay caused by the shape dimension of the sub-wavelength, and a degree at which the phase is delayed is determined by a detailed shape dimension and arrangement shape of the nano-posts NP. A peripheral material of the nano-posts NP may include a dielectric material having a lower refractive index than that of the nanoposts NP, and, for example, may include SiO$_2$ or air.

The light L$\lambda$1 of the first wavelength and the light L$\lambda$2 of the second wavelength may be visible light wavelength bands, but are not limited thereto, and various wavelength bands may be implemented according to rules of the disposed nano-posts NP. FIG. 4 illustrates that two wavelengths are diverged and condensed, but the disclosure is not limited thereto, and the incident light may be diverged and condensed in three or more directions according to wavelengths.

Hereinafter, an example in which the color separating lens array 130 is applied to the pixel array 1100 of the image sensor 1000 in FIG. 1 will be described in more detail.

Figure 5A:
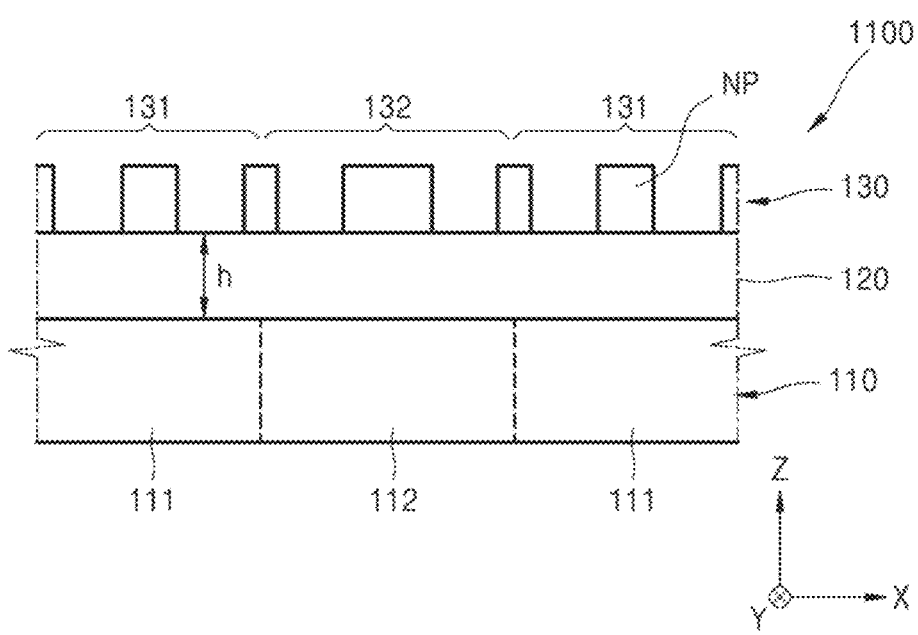
FIGS. 5A and 5B are cross-sectional views illustrating a pixel array including a color separating lens array according to an embodiment.
Figure 5B:
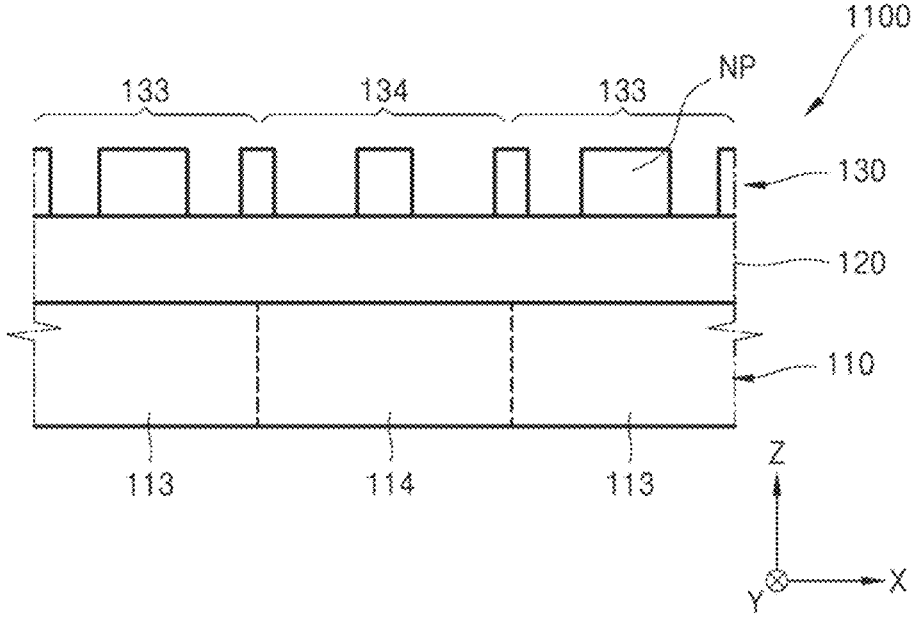

FIGS. 5A and 5B are cross-sectional views illustrating the pixel array 1100 including the color separating lens array 130 according to an embodiment.

Referring to FIGS. 5A and 5B, the pixel array 1100 may include the sensor substrate 110 including a plurality of photosensitive cells 111, 112, 113, and 114 sensing light, a transparent spacer layer 120 disposed on the sensor substrate 110 (that is, disposed above the sensor substrate 110 in the third direction (Z direction)), and the color separating lens array 130 disposed on the spacer layer 120 (that is, disposed above the transparent spacer layer 120 in the third direction (Z direction)).

The sensor substrate 110 may include a first photosensitive cell 111, a second photosensitive cell 112, a third photosensitive cell 113, and a fourth photosensitive cell 114 each converting light into an electrical signal. As shown in FIG. 5A, the first photosensitive cells 111 and the second photosensitive cells 112 may be alternately disposed in the first direction (X direction). In a cross-section with a different position in the second direction (Y direction), the third photosensitive cells 113 and the fourth photosensitive cells 114 may be disposed alternately as shown in FIG. 5B. Such a region division may be for dividing the incident light into pixel units and sensing the divided incident light. For example, the first photosensitive cell 111 and the fourth photosensitive cell 114 may sense light of a first wavelength corresponding to a first pixel and a fourth pixel, the second photosensitive cell 112 may sense light of a second wavelength corresponding to a second pixel, and the third photosensitive cell 113 may sense light of a third wavelength corresponding to a third pixel. Hereinafter, it is described that the light of the first wavelength is green light, the light of the second wavelength is red light, the light of the third wavelength is blue light, and the first pixel, the second pixel, and the third pixel and the fourth pixel are respectively the first green pixel Gr, the blue pixel B, the red pixel R, and the second green pixel Gb. However, the disclosure is not limited thereto. Although boundaries between the first to fourth photosensitive cells 111, 112, 113, and 114 are not shown in FIGS. 5A and 5B, a cell separation layer for cell separation may be further formed.

The color separating lens array 130 may include the nano-posts NP disposed based on a predefined rule. The color separating lens array 130 may further include a protective layer protecting the nano-posts NP. The protective layer may include a dielectric material having a lower refractive index than the refractive index of the material of the nano-post NP.

The color separating lens array 130 may be divided into a plurality of regions 131, 132, 133, and 134 respectively corresponding to and facing the plurality of photosensitive cells 111, 112, 113, and 114. One or more nano-posts NP may be disposed in each of the plurality of regions 131, 132, 133, and 134, and any one of the shapes, sizes, and arrangement thereof may be different according to the plurality of regions 131, 132, 133, and 134.

The plurality of regions 131, 132, 133, and 134 of the color separating lens array 130 may be divided to condense the light of the first wavelength into the first photosensitive cell 111 and the fourth photosensitive cell 114, to condense the light of the second wavelength into the second photosensitive cell 112, and to condense the light of the third wavelength into the third photosensitive cell 113. As described above, the sizes, shapes, and arrangement of the nano-posts NP are determined according to the plurality of regions 131, 132, 133, and 134 to condense the light.

A thickness of the spacer layer 120 may be adjusted in connection with color separation and condensation which will be described below with reference to FIGS. 8A to 10B.

Figure 6:
FIG. 6 is a diagram illustrating an arrangement of photosensitive cells according to an embodiment.
Figure 6:
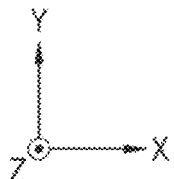

FIG. 6 is a diagram illustrating an arrangement of photosensitive cells according to an embodiment.

Referring to FIG. 6, the sensor substrate 110 may include the plurality of first photosensitive cells 111, the plurality of second photosensitive cells 112, the plurality of third photosensitive cells 113, and the plurality of fourth photosensitive cells 114. Descriptions of FIG. 6 similar to aspects of FIGS. 5A and 5B may be omitted.

When the pixel array 1100 has an arrangement of the Bayer pattern as shown in FIG. 2, the first photosensitive cell 111 may correspond to the first green pixel (Gr in FIG. 2), the second photosensitive cell 112 may correspond to the blue pixel (B in FIG. 2), the third photosensitive cell 113 may correspond to the red pixel (R in FIG. 2), and the fourth photosensitive cell 114 may correspond to the green pixel (Gb in FIG. 2). Accordingly, a first row in which the plurality of first photosensitive cells 111 and the plurality of second photosensitive cells 112 may be alternately disposed in the first direction (X direction) and a second row in which the plurality of third photosensitive cells 113 and the plurality of fourth photosensitive cells 114 may be alternately disposed in the first direction are repeatedly disposed in the second direction (Y direction) perpendicular to the first direction (X direction).

As described above, a color separating lens array including a plurality of nano-posts may be located above the sensor substrate 110 in the third direction (Z direction), and light of a wavelength corresponding to each of the first photosensitive cell 111, the second photosensitive cell 112, the third photosensitive cell 113, and the fourth photosensitive cell 114 may be condensed by an arrangement pattern of the plurality of nano-posts.

According to embodiments, the cross-sectional area of at least one nano-post located at the center of the color separating lens array and the cross-sectional area of a nano-post located at the periphery thereof and corresponding thereto may be different, or distances between adjacent nano-posts may be different, and thus, a difference in the intensity of green light condensed in the first photosensitive cell 111 and the fourth photosensitive cell 114 that are located at a periphery of the sensor substrate 110 and adjacent to each other may be reduced or prevented.

Figure 7:
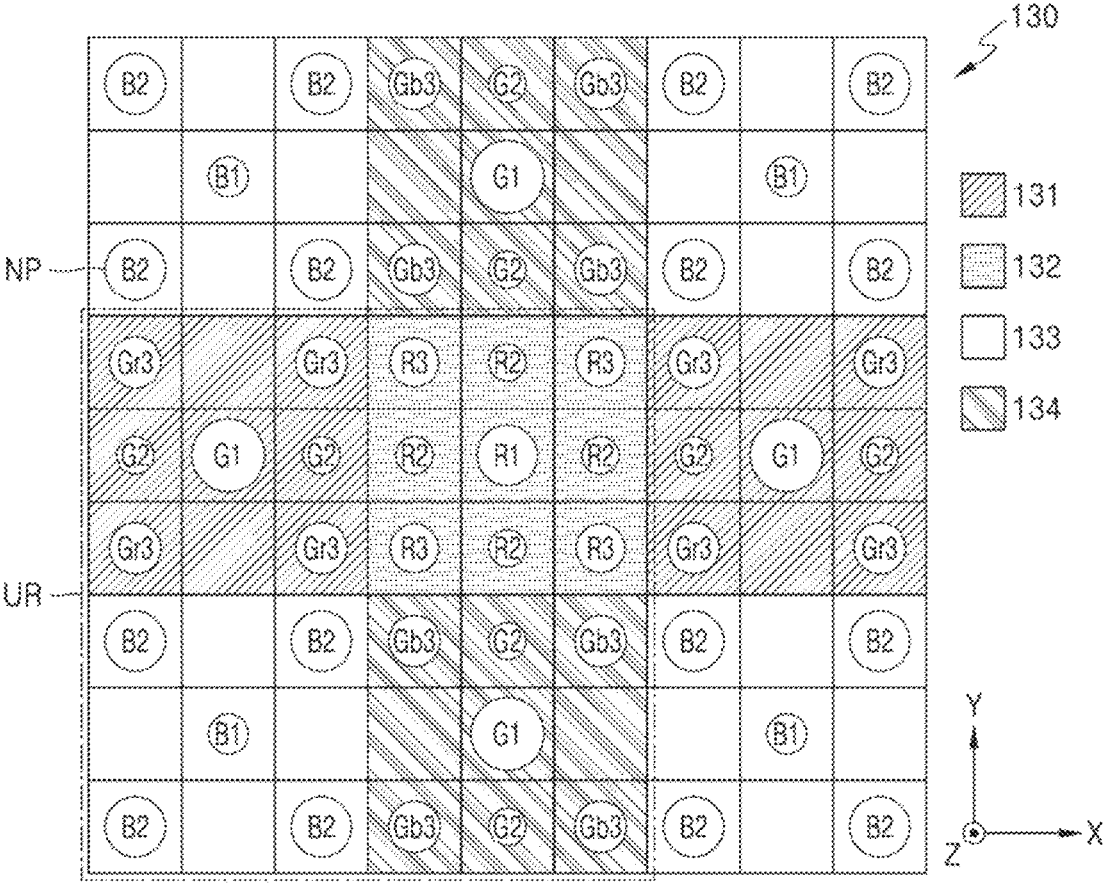
FIG. 7 is a plan view illustrating an arrangement of a plurality of nano-posts included in a color separating lens array according to an embodiment.

FIG. 7 is a plan view illustrating the arrangement of the plurality of nano-posts NP included in the color separating lens array 130 according to an embodiment. In FIG. 7, a unit region UR may include a first sub region 131, a second sub region 132, a third sub region 133 and a fourth sub region 134. FIG. 7 is for describing a unit area UR included in the color separating lens array 130, a first sub region 131, a second sub region 132, a third sub region 133, and a fourth sub region 134 included in the unit region UR. Referring to the description of the color separating lens array 130 shown in FIG. 7, the unit region UR_a shown in FIG. 13 and the unit region UR_b shown in FIG. 18 may be described later. The color separating lens array 130 according to the present disclosure may include a plurality of unit regions UR. Among a plurality of unit regions UR, a unit region located at the center of the color separating lens array may be the unit region UR_a shown in FIG. 13, and a unit region located at the periphery of the color separating lens array may be the unit area UR_b shown in FIG. 18. However, for convenience of explanation, only a portion of the color separating lens array 130 is shown in FIG. 7, and the color separating lens array 130 according to the present disclosure may include regions corresponding to each of the pixels included in the pixel array (1100 of FIG. 2). In other words, Referring to FIG. 2 since the pixel array 1100 of FIG. 2 includes 16 Bayer patterns, the color separation lens array 130 according to the present disclosure may include 16 unit regions UR. However, this is only an example for description, and the number of unit regions UR according to the present disclosure is not limited thereto.

Referring to FIG. 7, the first sub region 131 of the color separating lens array 130 may correspond to the first green pixel (Gr in FIG. 2), the second sub region 132 may correspond to the red pixel (R in FIG. 2), the third sub region 133 may correspond to the blue pixel (B in FIG. 2), and the fourth sub region 134 may correspond to the second green pixel (Gb in FIG. 2).

As shown in FIG. 7, the color separating lens array 130 may include a plurality of unit regions UR disposed two-dimensionally, and each of the plurality of unit regions UR may include the first sub region 131, the second sub region 132, the third sub region 133, and the fourth sub region 134 disposed in a 2×2 form. Each of the first sub region 131 corresponding to the first green pixel (Gr in FIG. 2), the second sub region 132 corresponding to the red pixel (R in FIG. 2), the third sub region 133 corresponding to the blue pixel (B in FIG. 2), and the fourth sub region 134 corresponding to the second green pixel (Gb in FIG. 2) included in the unit region UR may include a plurality of nano-posts NP having a circular cross-section. The nano-posts NP having different cross-sectional areas may be disposed in the center of each of the first sub region 131, the second sub region 132, and the third sub region 133. The nano-posts NP may be disposed on boundary lines between pixels, and also be disposed at intersections of the boundary lines. The cross-sectional area of the nano-post NP disposed in the boundary between pixels may be smaller than the cross-sectional area of the nano-post NP disposed in the center of the pixel.

Referring to FIG. 7, the same nano-post G1 may be located in the center of each of the first sub region 131 and the fourth sub region 134 included in the unit region UR. The cross-sectional area of the nano-post G1 located at the center of the first sub region 131 and the center of the fourth sub region 134 may be larger than the cross-sectional area of a nano-post R1 located at the center of the second sub region 132 or a nano-post B1 located at the center of the third sub region 133. The cross-sectional area of the nano-post R1 located at the center of the second sub region 132 may be larger than the cross-sectional area of the nano-post B1 located at the center of the third sub region 133. However, this is only one example, and the nano-posts NP of various shapes, sizes, and arrangements may be applied as needed.

The nano-posts NP included in the first sub region 131 corresponding to the first green pixel (Gb in FIG. 2) and the fourth sub region 134 corresponding to the second green pixel (Gb in FIG. 2) may have different distribution rules in the direction (X direction) and the second direction (Y direction).

Referring to FIG. 7, the first sub region 131 may include a nano-post G2 adjacent to the nano-post G1 located at the center of the first sub region 131 in the first direction (X direction). In addition, the first sub region 131 may not include a nano-post adjacent to the nano-post G1 in the second direction (Y direction). This is an example, and in embodiments of the disclosure, the first sub region 131 may include the nano-post adjacent to the nano-post G1 in the second direction (Y direction), and the cross-sectional area of the nano-post may be different from the cross-sectional area of any of the other nano-posts. Accordingly, the nano-posts NP included in the first sub region 131 may have different distribution rules in the first direction (X direction) and the second direction (Y direction).

Similarly, the fourth sub region 134 may not include a nano-post adjacent to the nano-post G1 in the first direction (X direction). In addition, the fourth sub region 134 may include the nano-post G2 adjacent to the nano-post G1 in the second direction (Y direction). This is an example, and in embodiments of the disclosure, the fourth sub region 134 may include the nano-post adjacent to the nano-post G1 in the first direction (X direction), and the cross-sectional area of the nano-post may be different from the cross-sectional area of any of the other nano-posts. Accordingly, the nano-posts NP included in the fourth sub region 134 may have different distribution rules in the first direction (X direction) and the second direction (Y direction).

On the other hand, the nano-posts NP disposed in the second sub region 132 corresponding to the red pixel (R in FIG. 2) and the third sub region 133 corresponding to the blue pixel (B in FIG. 2) may have symmetrical distribution rules in the first direction (X direction) and the second direction (Y direction), as will be understood by one of ordinary skill in the art from the disclosure herein.

Referring to FIG. 7, the arrangement in the first sub region 131, second sub region 132, third sub region 133, and fourth sub region 134 may be based on a Bayer pattern. Therefore, the distribution rules of the nano-posts disposed in each of the first sub region 131, second sub region 132, third sub region 133 and fourth sub region 134, as described above, are based on the characteristics of the Bayer pattern. As described above with reference to FIG. 2, the plurality of red pixels (R in FIG. 2) and the plurality of blue pixels (B in FIG. 2) may be adjacent to the same pixel (that is the green pixel (i.e., the first green pixel (Gr in FIG. 2) or the second green pixel (Gb in FIG. 2))) in the first direction (X direction) and the second direction (Y direction), but the first green pixel (Gr in FIG. 2) corresponding to the first sub region 131 may be adjacent to different pixels in the first direction (X direction) (e.g., the red pixel (R in FIG. 2) and in the second direction (Y direction) (e.g., the blue pixel (B in FIG. 2)). In addition, the second green pixel (Gb in FIG. 2) corresponding to the fourth sub region 134 may be adjacent to different pixels in the first direction (X direction) (e.g., the blue pixel (B in FIG. 2)) and in the second direction (Y direction) (e.g., the red pixel (R in FIG. 2)). That is, the first sub region 131 and the fourth sub region 134 are regions corresponding to green pixels, but the first sub region 131 and the fourth sub region 134 are different from each other in an region adjacent to the first direction (X direction) and an region adjacent to the second direction (Y direction).

In addition, the green pixels (Gr and Gb in FIG. 2) respectively corresponding to the first sub region 131 and the fourth sub region 134 may be adjacent to the same pixel (that is the green pixel (Gr or Gb in FIG. 2)) in four diagonal directions, the red pixel (R in FIG. 2) corresponding to the second sub region 132 may be adjacent to the same pixel (that is the blue pixel (B in FIG. 2)) in four diagonal directions, and the blue pixel (B in FIG. 2) corresponding to the third sub region 133 may be adjacent to the same pixel (that is the red pixel (R in FIG. 2)) in four diagonal directions. Accordingly, in the second sub region 132 and the third sub region 133 respectively corresponding to the red pixel (R in FIG. 2) and the blue pixel (B in FIG. 2), the nano-posts NP may be disposed in the form of 4-fold symmetry. In the first sub region 131 corresponding to the first green pixel (Gr in FIG. 2) and the fourth sub region 134 corresponding to the second green pixel (Gb in FIG. 2), the nano-posts NP may be disposed in the form of 2-fold symmetry. However, in the first sub region 131, the second sub region 132, the third sub region 133, and the fourth sub region 134 included in the unit region UR located at the center of the color separating lens array according to embodiments, the plurality of nano-posts NP may be disposed as described above. However, the second sub region 132 and the third sub region 133 included in the unit region UR located at the periphery of the color separating lens array according to embodiments may not be 4-fold symmetry, and the first sub region 131 and the fourth sub region 134 may not be 2-fold symmetry.

As described above with reference to FIG. 3, the patterns repeated on the color separating lens array 130 may include a first pattern in which the nano-posts G1, G2, and Gr3 included in the first sub region 131 corresponding to the first green pixel (Gr in FIG. 2) are disposed, a second pattern in which the nano-posts R1, R2, and R3 included in the second sub region 132 corresponding to the red pixel (R in FIG. 2) are disposed, a third pattern in the which the nano-posts B1 and B2 included in the third sub region 133 corresponding to the blue pixel (B in FIG. 2) are disposed, and a fourth pattern in the which nano-posts G1, G2, and Gb3 included in the fourth sub region 134 corresponding to the second green pixel (Gb in FIG. 2) are disposed. The first pattern may be adjacent to two second patterns in a first direction, and may be adjacent to two third patterns in a second direction perpendicular to the first direction. On the other hand, the fourth pattern may be adjacent to two third patterns in the first direction and may be adjacent to two second patterns in the second direction perpendicular to the first direction.

Since the first sub region 131 and the fourth sub region 134, which condense light (green light) of the same wavelength range in the incident light, are different from each other in regions adjacent in the first direction (X direction) and the second direction (Y direction), the first sub region 131 and the fourth sub region 134 may be rotated by 90 degrees with respect to each other. That is, an arrangement pattern of the plurality of nano-posts G1, G2, and Gr3 included in the first sub region 131 may correspond to a pattern of the plurality of nano-posts G1, G2, and Gb3 included in the fourth sub region 134 that is rotated by 90 degrees. That is, a cross-sectional area of the nano-post Gr3 may be the same as a cross-sectional area of the nano-post Gb3.

However, as described above, in order to reduce or prevent a difference in signal intensity and a color difference that occurs when a CRA of the incident light increases at the periphery of the color separating lens array 130, the cross-sectional area of the nano-post Gr3 and the cross-sectional area of the nano-post Gb3 included in one unit region (UR_a in FIG. 13) may be the same according to embodiments, but the cross-sectional area of the nano-post Gr3 and the cross-sectional area of the nano-post Gb3 included in one unit region (UR_b in FIG. 18) may be different from each other. In other words, the cross-sectional area of the nano-post Gr3 in a unit region located at the center of the color separating lens array 130 may be different from the cross-sectional area of the nano-post Gr3 in a unit region located at the periphery of the color separating lens array 130. Similarly, the cross-sectional area of the nano-post Gb3 located at the center of the color separating lens array 130 may be different from the cross-sectional area of the nano-post Gb3 located at the periphery of the color separating lens array 130.

The nano-posts NP shown in FIG. 7 are all shown to have a symmetrical circular cross-sectional shape, but the disclosure is not limited thereto, and the color separating lens array 130 may include nano-posts having an asymmetrical cross-sectional shape and nano-posts having a symmetrical cross-sectional shape other than a circular shape. For example, each of the first sub region 131 and the fourth sub region 134 respectively corresponding to the first green pixel (Gr in FIG. 2) and the second green pixel (Gb in FIG. 2) may include nano-posts having the asymmetrical cross-sectional shape with different widths in the first direction (X direction) and the second direction (Y direction), and each of the second sub region 132 and the third sub region 133 respectively corresponding to the red pixel (R in FIG. 2) and the blue pixel (B in FIG. 2) may include nano-posts having the symmetrical cross-sectional shape with the same width in the first direction (X direction) and the second direction (Y direction).

An arrangement rule of the color separating lens array 130 is an example of implementing a target phase profile to condense light of a first wavelength (a wavelength corresponding to green light) on the first photosensitive cell (111 in FIG. 6) and the fourth photosensitive cell (114 in FIG. 6), condense light of a second wavelength (a wavelength corresponding to red light) on the second photosensitive cell (112 in FIG. 6), and condense light of a third wavelength of light on the third photosensitive cell (113 of FIG. 6), and is not limited to the shown pattern. In addition, in order to solve the above-mentioned problems, it is described that the cross-sectional area of the nano-post Gr3 included in the unit region located at the center of the color separating lens array 130 is different from the cross-sectional area of the nano-post Gr3 included in the unit region located at the periphery of the color separating lens array 130, but this is an example.

It will be understood by one of skill in the art from the disclosure herein that cross-sectional areas of one or more of the plurality of nano-posts located at the center and the periphery of the color separating lens array 130 may be different from each other. In the present disclosure, the unit region UR located at the center of the color separating lens array 130 may be referred to as a central unit region. The unit region UR located at the periphery of the color separating lens array 130 may be referred to as a peripheral unit region. Similarly, the first sub region 131 included in the unit region located at the center of the color separating lens array 130 may be referred to as a first center region. The first sub region 131 included in the unit region located at the periphery of the color separating lens array 130 may be referred to as a first peripheral sub region. A second central sub region, a second peripheral sub region, a third central sub region, a third peripheral sub region, a fourth central sub region, and a fourth peripheral sub region may be understood through the above-described description.

Figure 8A:
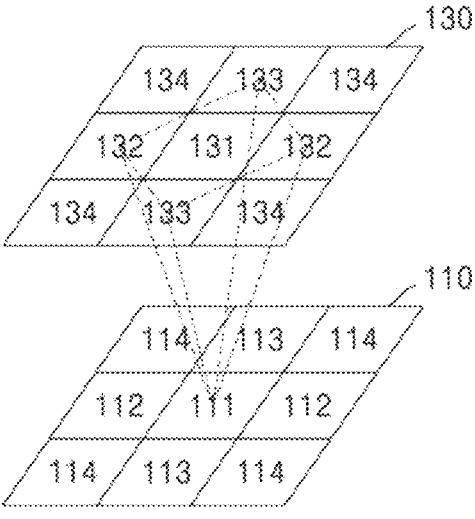
FIG. 8A is a diagram illustrating a traveling direction of green light incident on and around a first sub region of a color separating lens array corresponding to a first green pixel according to an embodiment.
Figure 8B:
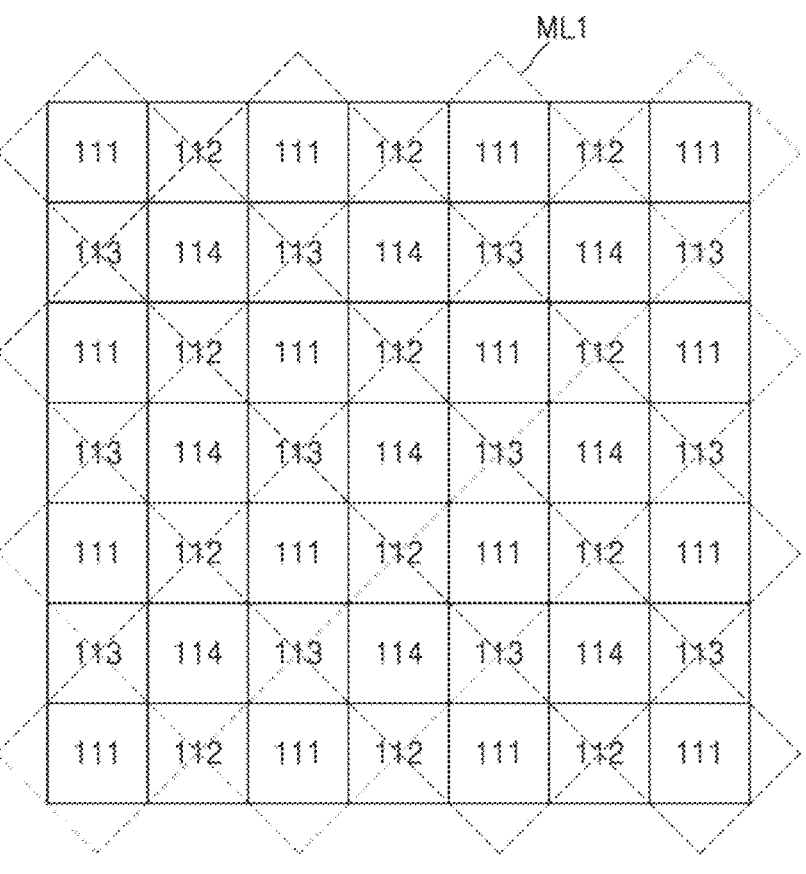
FIG. 8B is a diagram illustrating a micro lens array operating equivalently to the color separating lens array with respect to the green light according to an embodiment.

FIG. 8A is a diagram illustrating a traveling direction of green light incident on and around the first sub region 131 of the color separating lens array 130 corresponding to a first green pixel according to an embodiment, and FIG. 8B is a diagram illustrating a micro lens array operating equivalently to the color separating lens array 130 with respect to the green light according to an embodiment.

FIG. 8A illustrates that light passing through the color separating lens array 130 including the first sub region 131, the second sub region 132, the third sub region 133, and the fourth sub region 134 may be condensed on the first photosensitive cell 111 included in the sensor substrate 110.

As described above, the green light may be divided and condensed on regions respectively corresponding to the first green pixel (Gr in FIG. 2) and the second green pixel (Gb in FIG. 2), and may be prevented from reaching regions respectively corresponding to the red pixel (R in FIG. 2) and the blue pixel (B in FIG. 2).

Referring to FIG. 8A, the green light incident on and around the first sub region 131 corresponding to the first green pixel (Gr in FIG. 2) may travel after passing through the color separating lens array 130. For example, in the light incident on the first sub region 131 of the color separating lens array 130 and other regions surrounding the first sub region 131, the green light may be condensed on the first photosensitive cell 111 corresponding to the first sub region 131. Also, in the light incident on the fourth sub region 134 of the color separating lens array 130 and other regions surrounding the fourth sub region 134, the green light may be condensed on the fourth photosensitive cell 114 corresponding to the fourth sub region 134. In other words, green light that has passed through the first sub region 131 or the fourth sub region 134 corresponding to the green pixel (Gr or Gb in FIG. 2), and green light that has passed through the two second sub regions 132 and the two third sub regions 133 that are horizontally and vertically adjacent to the region 131 or the fourth sub region 134, may be incident on one green pixel (Gr or Gb in FIG. 2). Therefore, in order to reduce or prevent a difference between the intensity of a first green pixel signal and the intensity of a second green pixel signal described above, cross-sectional areas of nano-posts included in the first sub region 131 and/or the fourth sub region 134 and cross-sectional areas of nano-posts included in the second sub region 132 and/or the third sub region 133 may be designed differently.

FIG. 8B illustrates micro lenses ML1 disposed around the first and fourth photosensitive cells 111 and 114 and configured to function equivalently to the color separating lens array 130 of FIG. 8A.

Referring to FIG. 8B, each of the equivalent micro lenses ML1 may have a larger area than the first photosensitive cell 111 or the fourth photosensitive cell 114 corresponding thereto. Therefore, each of the equivalent micro lenses ML1 may condense not only the green light incident on the regions respectively corresponding to the first photosensitive cell 111 and the fourth photosensitive cell 114, but also the green light incident on other regions surrounding the regions respectively corresponding to the first photosensitive cell 111 and the fourth photosensitive cell 114. For example, each of the micro lenses ML1 may have an area about two times as large as that of the first photosensitive cell 111 or the fourth photosensitive cell 114 corresponding thereto, and may be disposed to contact the first photosensitive cell 111 or the fourth photosensitive cell 114 corresponding thereto in a diagonal direction.

Figure 9A:
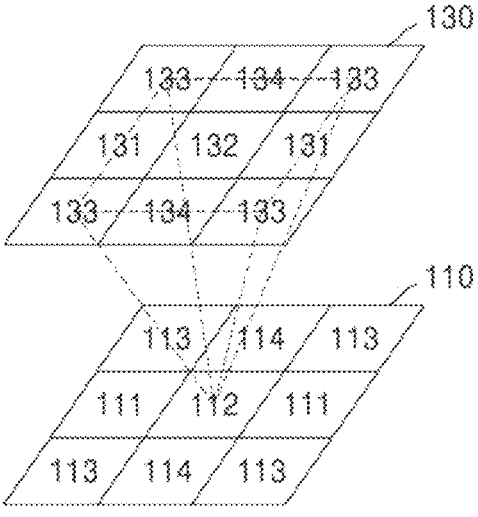
FIG. 9A is a diagram illustrating a traveling direction of red light incident on and around a second sub region of the color separating lens array corresponding to a red pixel according to an embodiment.
Figure 9B:
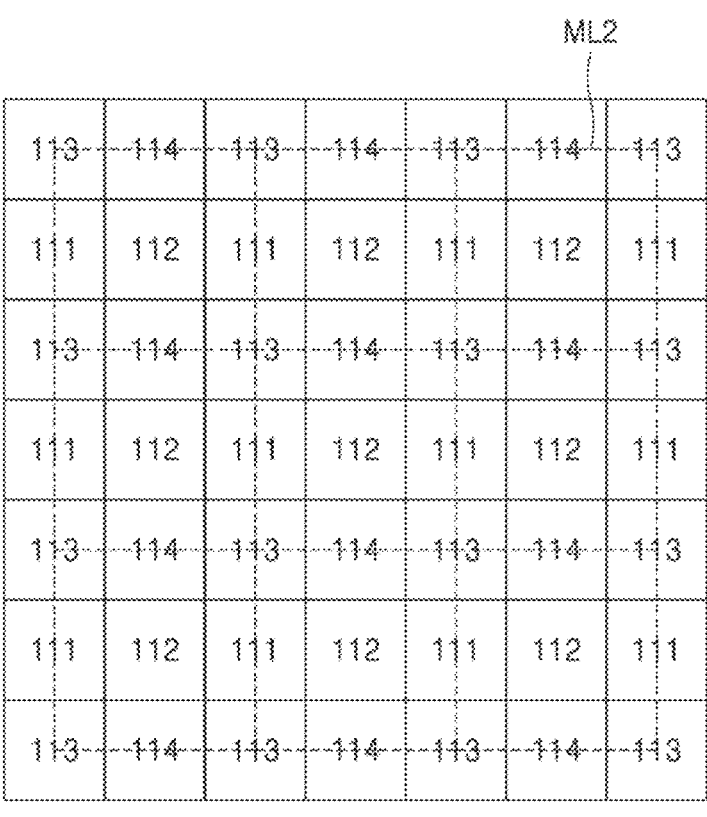
FIG. 9B is a diagram illustrating a micro lens array operating equivalently to the color separating lens array with respect to the red light according to an embodiment.

FIG. 9A is a diagram illustrating a traveling direction of red light incident on and around the second sub region 132 of the color separating lens array 130 corresponding to a red pixel according to an embodiment, and FIG. 9B is a diagram illustrating a micro lens array operating equivalently to the color separating lens array 130 with respect to the red light according to an embodiment.

FIG. 9A illustrates that light passing through the color separating lens array 130 including the first sub region 131, the second sub region 132, the third sub region 133, and the fourth sub region 134 may be condensed on the second photosensitive cell 112 included in the sensor substrate 110.

As described above, the red light may be divided and condensed on a region corresponding to the red pixel (R in FIG. 2), and may be prevented from reaching regions respectively corresponding to the first green pixel (Gr in FIG. 2), the second green pixel (Gb in FIG. 2), and the blue pixel (B in FIG. 2).

Referring to FIG. 9A, the red light incident on and around the second sub region 132 corresponding to the red pixel (R in FIG. 2) may travel after passing through the color separating lens array 130. For example, in the light incident on the second sub region 132 of the color separating lens array 130 and other regions surrounding the second sub region 132, the red light may be condensed on the second photosensitive cell 112 corresponding to the second sub region 132. In other words, red light being emitted from the second sub region 132 corresponding to the red pixel (R in FIG. 2), red light being emitted from two first sub regions 131 adjacent to the second sub region 132 in a horizontal direction, red light being emitted from two fourth sub regions 134 adjacent to the second sub region 132 in a vertical direction, and red light being emitted from four fourth sub regions 134 adjacent to the second sub region 132 in a diagonal direction may be incident on one red pixel (R in FIG. 2).

In addition, as described above, in order to reduce or prevent a difference between the intensity of a first green pixel signal and the intensity of a second green pixel signal, among a plurality of nano-posts included in the second sub region 132, cross-sectional areas of the nano-posts disposed adjacent to the first sub region 131 and/or the fourth sub region 134 may be designed differently.

FIG. 9B illustrates micro lenses ML2 disposed around the second photosensitive cell 112 and configured to function equivalently to the color separating lens array 130 of FIG. 9A.

Referring to FIG. 9B, each of the equivalent micro lenses ML2 may have a larger area than the second photosensitive cell 112. Therefore, each of the equivalent micro lenses ML2 may condense the red light incident on the region of the second photosensitive cell 112, and the red light incident on other regions surrounding the region corresponding to the second photosensitive cell 112. For example, each of the micro lenses ML2 may be about four times larger than the second photosensitive cell 112 corresponding thereto, and four sides of each of the micro lenses ML2 may be parallel to four sides of the second photosensitive cell 112.

Figure 10A:
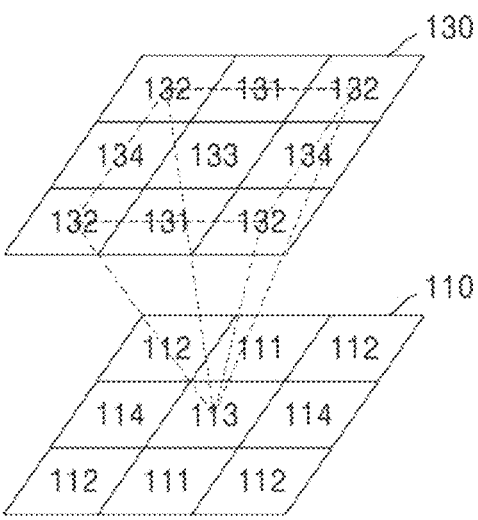
FIG. 10A is a diagram illustrating a traveling direction of blue light incident on and around a third sub region of the color separating lens array corresponding to a blue pixel according to an embodiment.
Figure 10B:
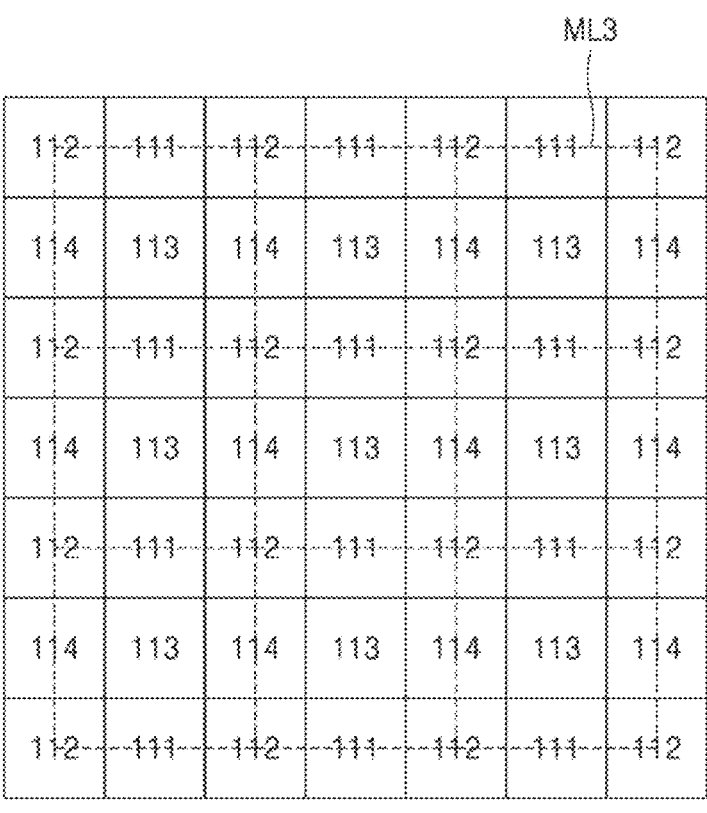
FIG. 10B is a diagram illustrating a micro lens array operating equivalently to the color separating lens array with respect to the blue light according to an embodiment.

FIG. 10A is a diagram illustrating a traveling direction of blue light incident on and around the third sub region 133 of the color separating lens array 130 corresponding to a blue pixel according to an embodiment, and FIG. 10B is a diagram illustrating a micro lens array operating equivalently to the color separating lens array 130 with respect to the blue light according to an embodiment.

FIG. 10A illustrates that light passing through the color separating lens array 130 including the first sub region 131, the second sub region 132, the third sub region 133, and the fourth sub region 134 may be condensed on the third photosensitive cell 113 included in the sensor substrate 110.

As described above, the blue light may be divided and condensed on a region corresponding to the blue pixel (B in FIG. 2), and may be prevented from reaching regions respectively corresponding to the first green pixel (Gr in FIG. 2), the second green pixel (Gb in FIG. 2), and the red pixel (R in FIG. 2).

Referring to FIG. 10A, the blue light incident on and around the third sub region 133 corresponding to the blue pixel (B in FIG. 2) may travel after passing through the color separating lens array 130. For example, in the light incident on the third sub region 133 of the color separating lens array 130 and other regions surrounding the third sub region 133, the blue light may be condensed on the third photosensitive cell 113 corresponding to the third sub region 133. In other words, blue light being emitted from the third sub region 133, blue light being emitted from two fourth sub regions 134 adjacent to the third sub region 133 in a horizontal direction, blue light being emitted from two first sub regions 131 adjacent to the third sub region 133 in a vertical direction, and blue light being emitted from four second sub regions 132 adjacent to the third sub region 133 in a diagonal direction may be incident on one blue pixel (B in FIG. 2).

In addition, as described above, in order to reduce or prevent a difference between the intensity of a first green pixel signal and the intensity of a second green pixel signal, among a plurality of nano-posts included in the third sub region 133, cross-sectional areas of the nano-posts disposed adjacent to the first sub region 131 and/or the fourth sub region 134 may be designed differently.

FIG. 10B illustrates micro lenses ML3 disposed around the third photosensitive cell 113 and configured to function equivalently to the color separating lens array 130 of FIG. 10A.

Referring to FIG. 10B, since each of the equivalent micro lenses ML3 is larger than the third photosensitive cell 113 corresponding thereto, each of the micro lenses ML3 may condense the blue light incident on the region corresponding to the third photosensitive cell 113 and the blue light incident on other regions surrounding the region corresponding to the third photosensitive cell 113. For example, each of the micro lenses ML3 may be about four times larger than the third photosensitive cell 113 corresponding thereto, and four sides of each of the micro lenses ML3 may be parallel to four sides of the third photosensitive cell 113.

The color separation and condensation described above with reference to FIGS. 8A, 8B, 9A, 9B, 10A, and 10B may be more effectively performed by appropriately setting a thickness (h in FIG. 5A) of the spacer layer (120 in FIG. 5A) along with sizes and an arrangement pattern of the plurality of nano-posts NP included in the color separating lens array 130. For example, a thickness ht of the spacer layer (120 in FIG. 5A) for effective color separation and condensation may be determined according to Equation (1).

$$h_t = \frac{np^2}{\lambda_0} - \frac{\lambda_0}{4n} \tag{1}$$

$\lambda 0$ denotes a wavelength of light to be color separated, n denotes a refractive index of the spacer layer (120 in FIG. 5A), and p denotes a pitch of a photosensitive cell. However, the actual thickness of the spacer layer (120 in FIG. 5A) may not be limited to only the theoretical thickness ht described in Equation (1)). For example, considering the efficiency of the color separating lens array 130, the actual thickness of the spacer layer (120 in FIG. 5A) may be selected within a certain range with respect to the theoretical thickness ht.

Figures 11A, 11B:
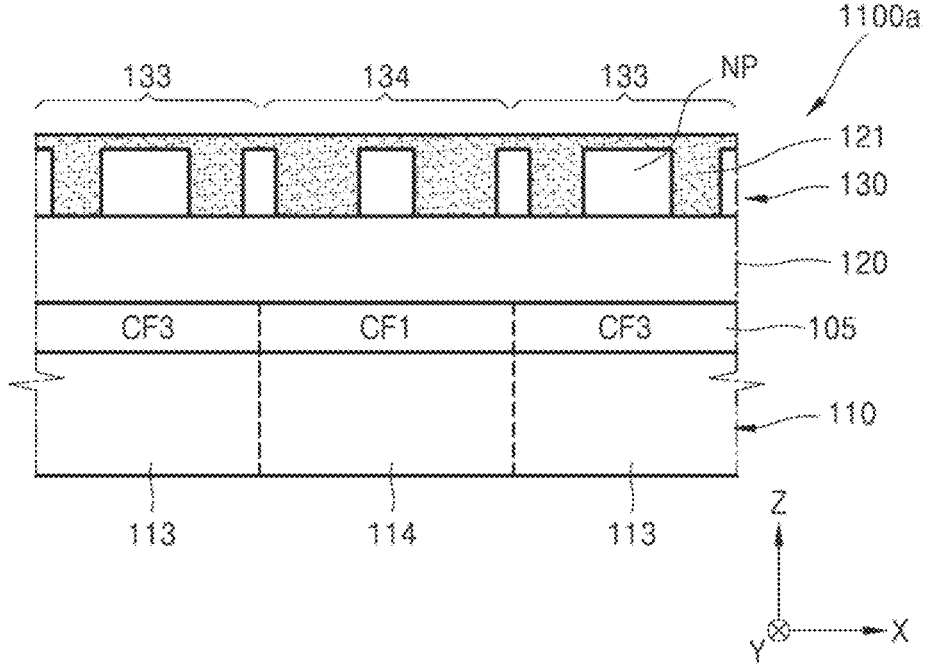
FIGS. 11A and 11B are cross-sectional views illustrating a pixel array according to an embodiment.

FIGS. 11A and 11B are cross-sectional views illustrating a pixel array 1100a according to an embodiment.

The pixel array 1100a differs from the embodiment described with reference to FIGS. 5A and 5B in that a color filter 105 is further disposed between the sensor substrate 110 and the color separating lens array 130. The color filter 105 may be disposed between the sensor substrate 110 and the spacer layer 120. That is, the color filter 105 may be located on an upper portion of the sensor substrate 110 and a lower portion of the spacer layer 120.

The pixel array 1100a may further include a transparent dielectric layer 121 protecting the color separating lens array 130. The dielectric layer 121 may be disposed to cover spaces between the adjacent nano-posts NP and upper surfaces of the nano-posts NP. The dielectric layer 121 may include a material having a lower refractive index than that of the nano-post NP (for example, the same material as the spacer layer 120).

The color filter 105 may include a filter region in a form corresponding to a pixel arrangement of the Bayer pattern. As shown in FIG. 11A, first filter regions CF1 passing green light therethrough and second filter regions CF2 passing red light therethrough may be alternately disposed in the first direction (X direction). As shown in FIG. 11B, third filter regions CF3 passing blue light therethrough and the first filter regions CF1 passing green light therethrough may be alternately disposed in the first direction (X direction) at a next row spaced apart in the second direction (Y direction). The configuration of the color filter 105 may be optional as the color separating lens array 130 diverges and condenses light of different wavelengths in the plurality of photosensitive cells 111, 112, 113, and 114. However, color purity may be supplemented by additionally including the color filter 105, and since light that is color-separated to a significant degree is incident on the color filter 105, light loss is not significant.

The color filter 105 according to embodiments may have different areas of color regions thereof corresponding to the center and the periphery of the color separating lens array 130 in order to correct a color difference that may occur when a CRA increases from the center to the periphery of the color separating lens array 130. This will be described below with reference to FIGS. 23A, 23B, 23C, and 23D.

Figure 12A:
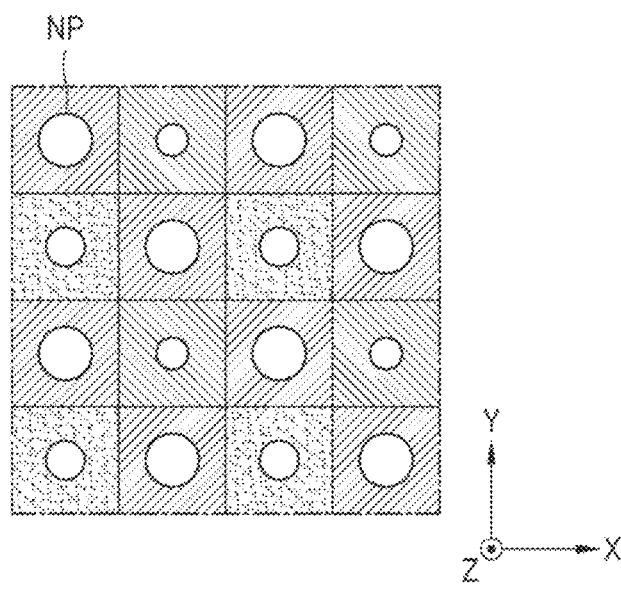
FIGS. 12A, 12B, and 12C are plan views illustrating changes in the positions of nano-posts included in a color separating lens array according to an embodiment.
Figure 12B:
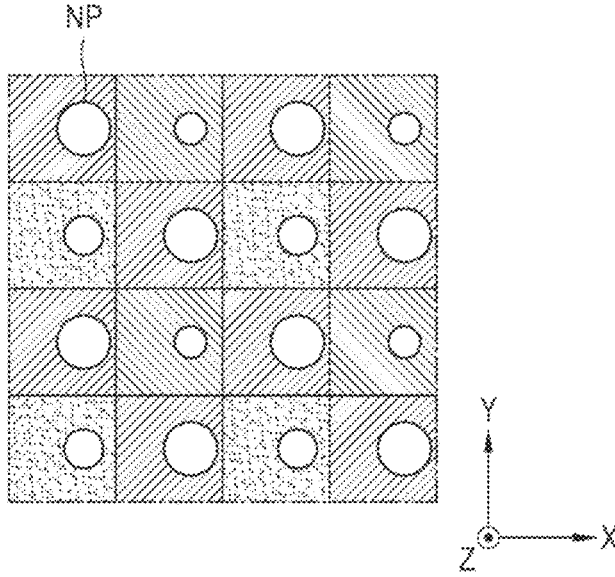
Figure 12C:
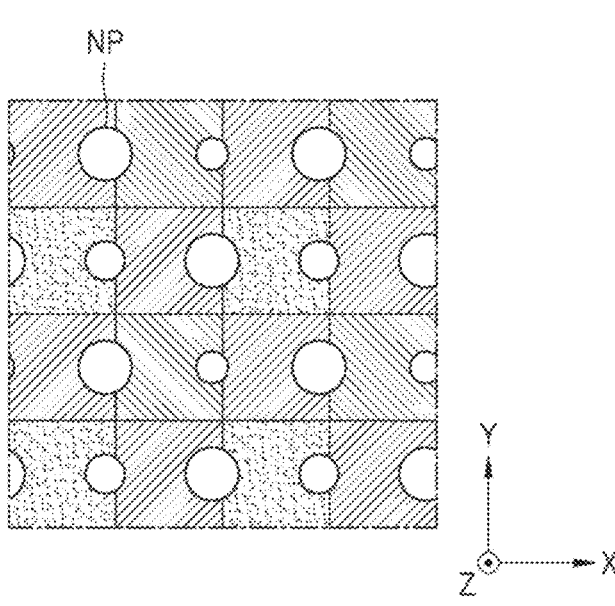

FIGS. 12A, 12B, and 12C are plan views illustrating changes in the positions of the nano-posts NP included in a color separating lens array according to an embodiment.

The color separation efficiency of the color separating lens array may vary when a CRA increases from the center to the periphery of a region within the color separating lens array. Therefore, in order to achieve constant color separation efficiency in the center and the periphery of a region of the color separating lens array, a plurality of different nano-posts having different arrangement shapes at the center and the periphery of a region of the color separating lens array may be provided. For example, the arrangement shape of a plurality of nano-posts included in the central unit region located in the center of the color separating lens array may be different from the arrangement shape of a plurality of nano-posts included in the peripheral unit region located in the periphery of the color separating lens array. For example, the cross-sectional area of at least one nano-post included in the central unit region and the nano-post included in the peripheral unit region may be different.

In order to reduce or prevent a difference between the intensity of a first green pixel signal and the intensity of a second green pixel signal, cross-sectional areas of nano-posts located at the center and the periphery of a region of the color separating lens array may be designed differently. FIGS. 12A, 12B, and 12C are plan views illustrating changes in the arrangement form (or the positions) of the nano-posts NP included in the color separating lens array according to positions within a region of the color separating lens array. That is, in FIGS. 12A, 12B, and 12C, cross-sectional areas of the nano-posts NP according to the positions within a region of the color separating lens array are shown as being the same for convenience of explanation, however, one of skill in the art will understand from the disclosure herein that the cross-sectional areas of the corresponding nano-posts NP may further vary. For example, FIG. 12A represents the nano-posts NP located in the center of the color separating lens array, and FIG. 12B represents the nano-posts NP away from the center of the color separating lens array than the nano-posts NP shown in FIG. 12A. FIG. 12C represents nano-posts NP further away from the center portion of the color separation lens array than the nano-posts NP shown in FIG. 12B. That is, the nano-post NP included in the region (e.g., peripheral unit region) located far from the center of the color separating lens array may be shifted more toward the center of the color separating lens array. For example, since the nano-posts NP shown in FIGS. 12B and 12C are shifted in the first direction (X direction) compared to the nano-posts NP shown in FIG. 12A, the center of the separating lens array may be located in the first direction (X direction) with respect to the nano-posts NP shown in FIGS. 12B and 12C, respectively. Similarly, referring to the above-described reference, it may be understood that the nano-posts NP are more shifted toward the center of the pixel array and the center of the sensor substrate as they are located farther from the center of the color separating lens array. Accordingly, the center of the pixel array and the center of the sensor substrate may be located in the first direction (X direction) with respect to the nano-posts NP shown in FIGS. 12B and 12C, respectively.

It may be understood that each of FIGS. 12A, 12B, and 12C illustrates nano-posts NP included in four unit regions. Referring to FIGS. 12A, 12B, and 12C together with FIG. 7, it may be understood that FIGS. 12A, 12B, and 12C respectively illustrate nano-posts NP included in four unit regions. For convenience of description, one region illustrated in FIGS. 12A, 12B, and 12C respectively includes (or corresponds to) one nano-post NP, but the present disclosure is not limited thereto as described with reference to FIG. 7. As described above, FIG. 12A illustrates the positions of the plurality of nano-posts NP disposed at the center of the regions of the color separating lens array, FIG. 12B illustrates the positions of the plurality of nano-posts NP disposed between the center and the periphery of the regions of the color separating lens array, and FIG. 12C illustrates the positions of the plurality of nano-posts NP disposed at the periphery of the regions of the color separating lens array. The disclosure is not limited to a specific arrangement of the plurality of nano-posts NP shown in FIGS. 12A, 12B, and 12C. FIGS. 12A, 12B, and 12C are diagrams conceptually explaining changes in the relative positions of the plurality of nano-posts NP according to the positions on the color separating lens array.

Figure 13:
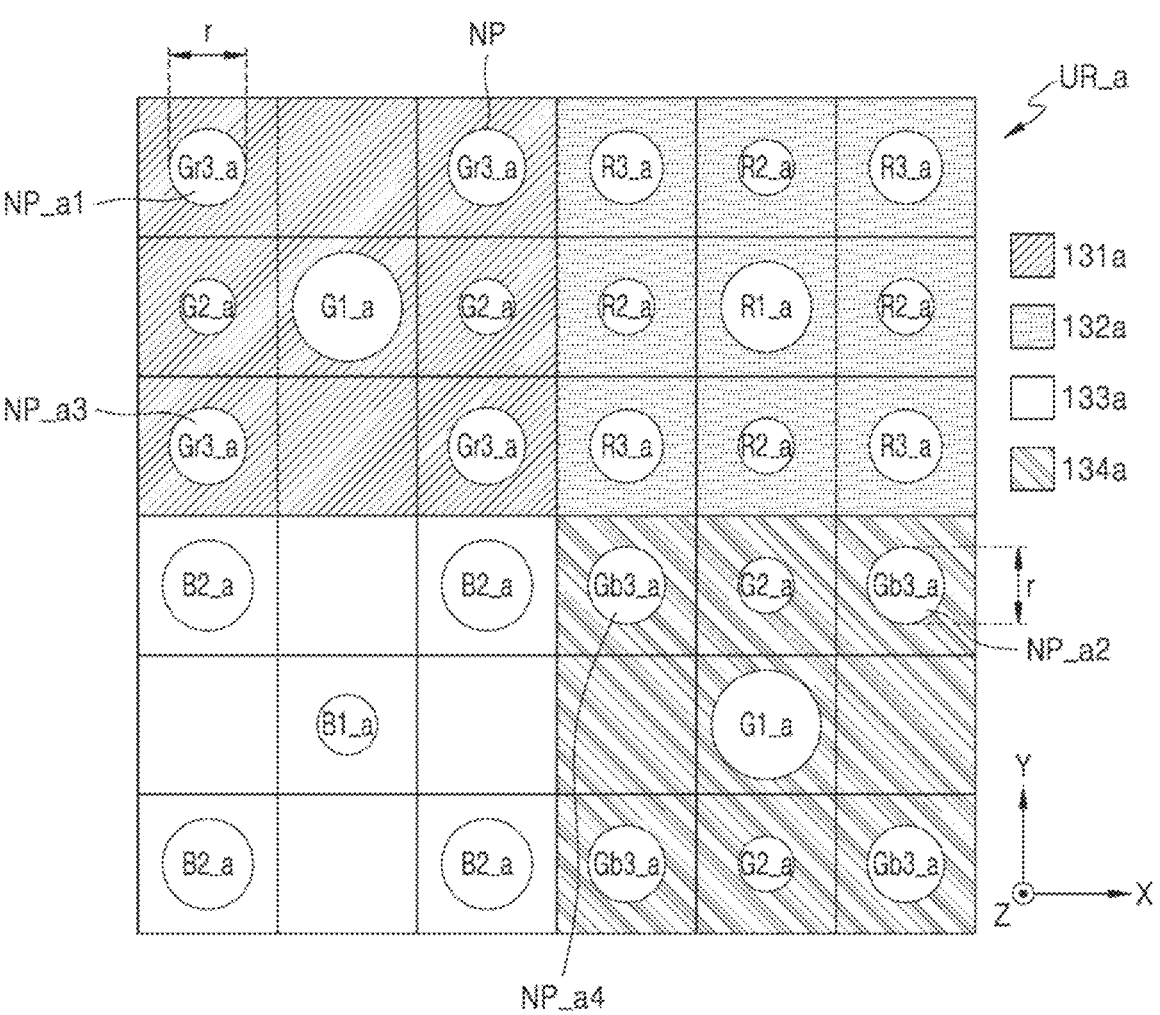
FIG. 13 is a plan view illustrating a unit region included in a color separating lens array according to an embodiment.

FIG. 13 is a plan view illustrating a unit region UR_a included in a color separating lens array according to an embodiment.

FIG. 13 illustrates the unit region UR_a located at or near the center of the color separating lens array among a plurality of unit regions included in the color separating lens array according to embodiments. Therefore, the unit region UR_a may be referred to as a central unit region. Accordingly, the first sub region 131a may be referred to as a first central sub region, the second sub region 132a may be referred to as a second central sub region, the third sub region 133a may be referred to as a third central sub region, and the fourth sub region 134a may be referred to as a fourth central sub region.

The unit region UR_a may include a first sub region 131a, a second sub region 132a, a third sub region 133a, and a fourth sub region 134a, and the first sub region 131a, the second sub region 132a, the third sub region 133a, and the fourth sub region 134a may each include the plurality of nano-posts NP. Sizes and an arrangement form of the plurality of nano-posts NP included in each of the first sub region 131a, the second sub region 132a, the third sub region 133a, and the fourth sub region 134a may be similar as those described with reference to FIG. 7, and thus, repeated descriptions may be omitted. The first sub region 131a, the second sub region 132a, the third sub region 133a, and the fourth sub region 134a included in the unit region UR_a may respectively correspond to the first green pixel (Gr in FIG. 2), the red pixel (R in FIG. 2), the blue pixel (B in FIG. 2), and the second green pixel (Gb in FIG. 2).

Referring to FIG. 13, a diameter r of a nano-post Gr3_a included in the first sub region 131a may be the same as the diameter r of a nano-post Gb3_a included in the fourth sub region 134a and corresponding thereto. In the description below, a nano-post "corresponding to" another nano-post may indicate a rotational correspondence relationship. For example, referring to FIG. 13, region 134a may be a 90 degree rotated arrangement of region 131a, such that nano-post NP_a1 rotationally corresponds to nano-post NP_a2, and nano-post NP_a3 rotationally corresponds to nano-post NP_a4.

Therefore, at or near the center of the color separating lens array, an arrangement pattern of the plurality of nano-posts G1_a, G2_a, and Gr3_a included in the first sub region 131a may be obtained by rotating an arrangement pattern of the plurality of nano-posts G1_a, G2_a, and Gb3_a included in the fourth sub region 134a by 90 degrees. In this case, a ratio of a cross-sectional area of the nano-post Gb3_a to a cross-sectional area of the nano-post Gr3_a included in one region UR_a may be 1. Accordingly, cross-sectional areas of two corresponding nano-posts NP included in each of the first sub region 131a and fourth sub region 134a included in the unit region UR_a located in the center of the color separating lens array may be the same. However, the present disclosure is not limited thereto.

As described above, the arrangement pattern of the plurality of nano-posts G1_a, G2_a, and Gr3_a included in the first sub region 131a may be obtained by rotating the arrangement pattern of the plurality of nano-posts G1_a, G2_a, and Gb3_a included in the fourth sub region 134a by 90 degrees, and thus, a plurality of nano-posts included in the first sub region 131a and the fourth sub region 134a included in one unit region UR_a located at or near the center of the color separating lens array may correspond to each other. For example, a nano-post NP_a1 included in the first sub region 131a and a nano-post NP_a2 included in the fourth sub region 134a may correspond to each other. Similarly, a nano-post NP_a3 included in the first sub region 131a and a nano-post NP_a4 included in the fourth sub region 134a may correspond to each other. In the above example, when the first sub region 131a is rotated 90 degrees clockwise, peripheral nano-posts with the same relative positions, but the disclosure is not limited thereto, and when the first sub region 131a is rotated counterclockwise, the peripheral nano-posts with the same relative positions may correspond to each other.

Figure 14A:
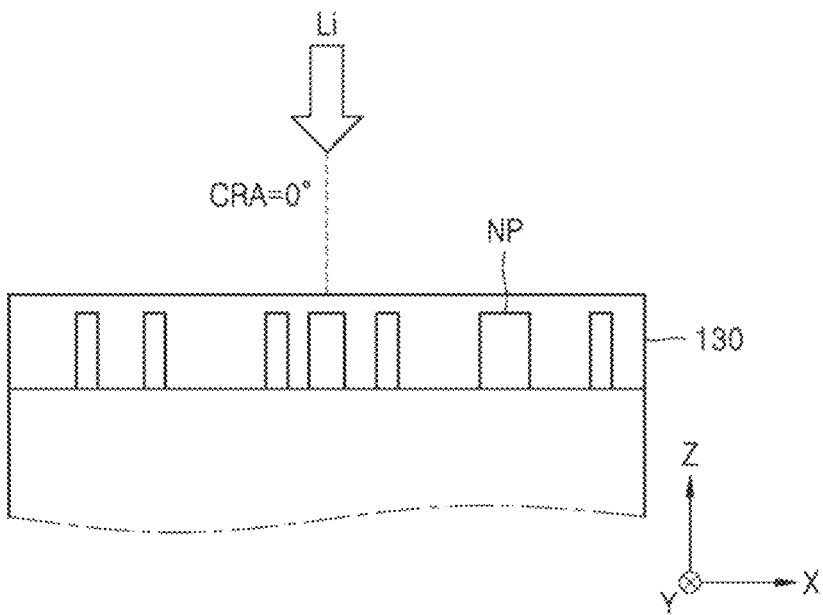
FIG. 14A is a cross-sectional view illustrating a color separating lens array including a plurality of nano-posts according to an embodiment.
Figure 14B:
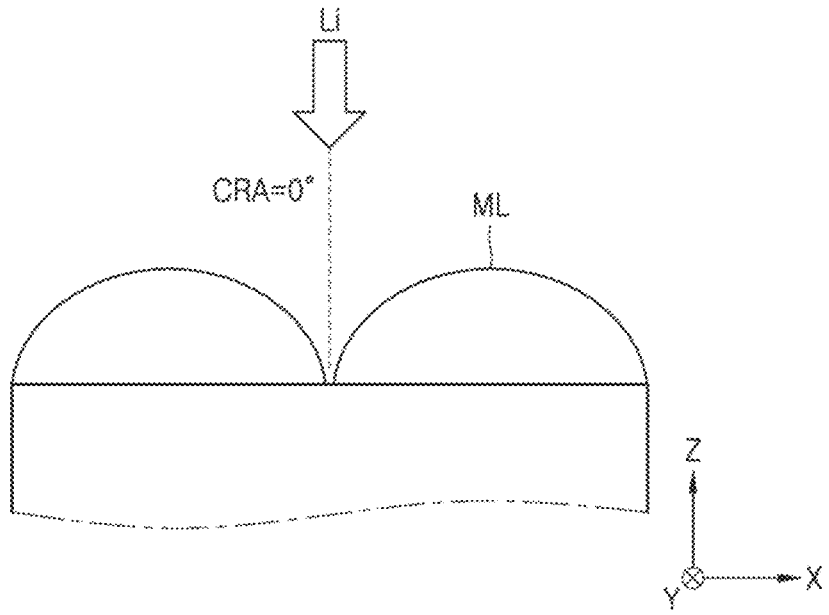
FIG. 14B is a cross-sectional view illustrating a micro lens corresponding to the cross-sectional view of FIG. 14A according to an embodiment.

FIG. 14A is a cross-sectional view illustrating the color separating lens array 130 including the plurality of nano-posts NP according to an embodiment. FIG. 14B is a cross-sectional view illustrating a micro lens ML corresponding to the cross-sectional view of FIG. 14A according to an embodiment.

Although FIGS. 14A and 14B are respectively cross-sectional views of only the color separating lens array 130 and the micro lens ML, it may be seen from the foregoing that the photosensitive cell, the spacer layer, and the color filter described above may be located below each of the color separating lens array 130 and the micro lens ML. The photosensitive cell, the spacer layer, and the color filter have been described above, and thus, repeated descriptions may be omitted.

FIG. 14A illustrates the plurality of nano-posts NP located at the center of the color separating lens array 130. For example, the nano-posts NP of FIG. 14A may be the nano-posts NP included in the unit region UR_a of FIG. 13.

As described with reference to FIG. 2, a CRA of the incident light Li at the center of the color separating lens array 130 may be minimum, and therefore, as described above, the CRA of the incident light Li may be 0 degrees.

FIG. 14B illustrates the micro lens ML located at the periphery of an image sensor corresponding to the center of the color separating lens array 130 of FIG. 14A. As described above, the CRA of the incident light Li incident on the micro lens ML at the center of the image sensor may be 0 degrees.

Figure 15A:
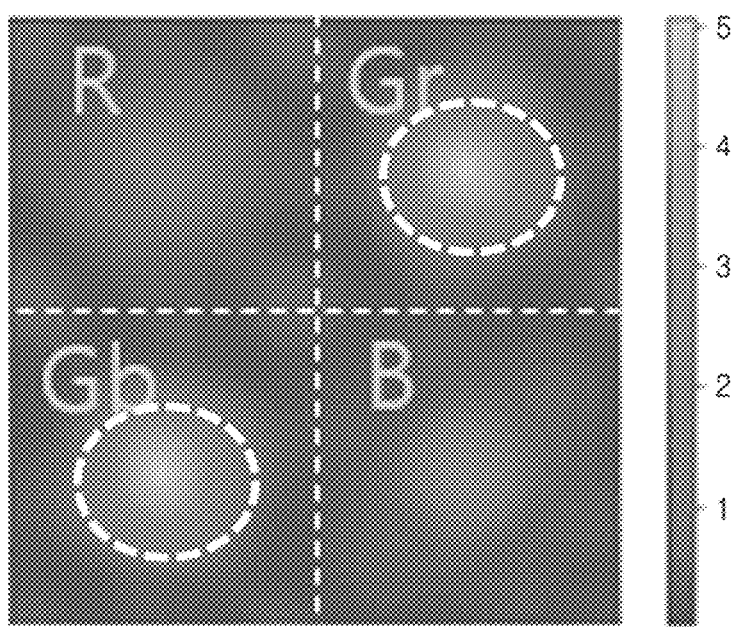
FIG. 15A is a diagram illustrating an intensity of light condensed on a photosensitive cell by a color separating lens array according to an embodiment.
Figure 15B:
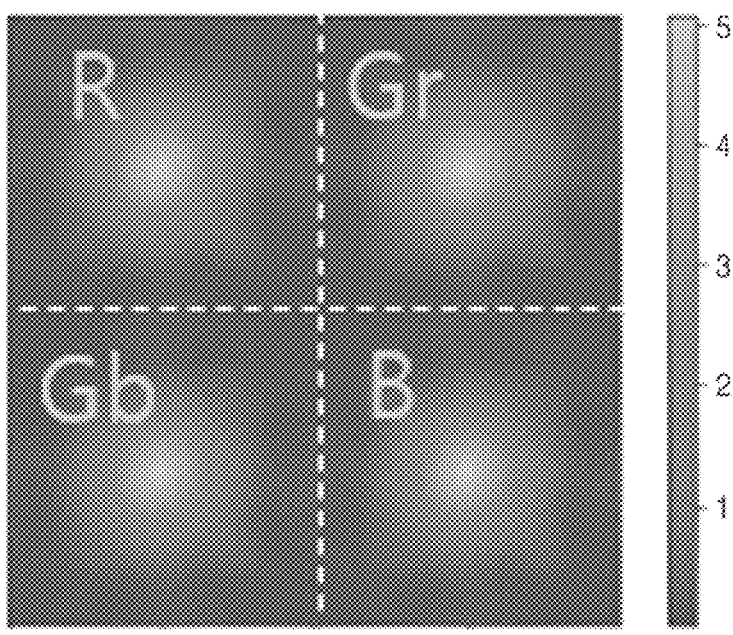
FIG. 15B is a diagram illustrating an intensity of light condensed on a photosensitive cell by a micro lens.

FIG. 15A is a diagram illustrating the intensity of light condensed on a photosensitive cell by a color separating lens array according to an embodiment. FIG. 15B is a diagram illustrating the intensity of light condensed on a photosensitive cell by a micro lens according to an embodiment.

FIGS. 15A and 15B illustrate the intensity of the light condensed on the photosensitive cell by the color separating lens array 130 of FIG. 14A and the micro lens ML of FIG. 14B, respectively.

FIG. 15A illustrates the intensity of green light condensed on photosensitive cells respectively corresponding to the first green pixel Gr, the red pixel R, the blue pixel B, and the second green pixel Gb at the center of the color separating lens array.

Referring to FIG. 15A, as described above, at the center of the color separating lens array, the intensity of the green light condensed on the photosensitive cells corresponding to the first green pixel Gr and the second green pixel Gb is greater than the intensity of the green light condensed on the photosensitive cells corresponding to the red pixel R and the blue pixel B. In addition, the intensity of the green light condensed on the photosensitive cell corresponding to the first green pixel Gr may be the same as or have a very small difference from the intensity of the green light condensed on the photosensitive cell corresponding to the second green pixel Gb.

As described above, a CRA of incident light may be close to 0 degrees. In addition, even though an arrangement pattern of a plurality of nano-posts included in a first sub region corresponding to the first green pixel Gr and regions adjacent to the first sub region is rotated by 90 degrees with respect to an arrangement pattern of a plurality of nano-posts included in a fourth sub region corresponding to the second green pixel Gb and regions adjacent to the fourth sub region (even though the arrangement patterns of the nano-posts are different), since the CRA is small at the center of the color separating lens array, the intensity of the green light condensed on the photosensitive cell corresponding to the green pixel Gr and the intensity of the green light condensed on the photosensitive cell corresponding to the second green pixel Gb have little difference. Therefore, the intensity of a first green pixel signal generated based on the green light condensed on the photosensitive cell corresponding to the first green pixel Gr and the intensity of a second green pixel signal generated based on the green light condensed on the photosensitive cell corresponding to the second green pixel Gb may be approximately the same at the center of the color separating lens array.

FIG. 15B illustrates the intensity of green light condensed on photosensitive cells respectively corresponding to the first green pixel Gr, the red pixel R, the blue pixel B, and the second green pixel Gb by the micro lens at the center of an image sensor.

Referring to FIG. 15B, as described above, at the center of the image sensor, the intensity of the green light condensed on the photosensitive cells respectively corresponding to the first green pixel Gr and the second green pixel Gb and the intensity of the green light condensed on the photosensitive cells respectively corresponding to the red pixel R and the blue pixel B may have no significant difference by the micro lens.

Figure 16A:
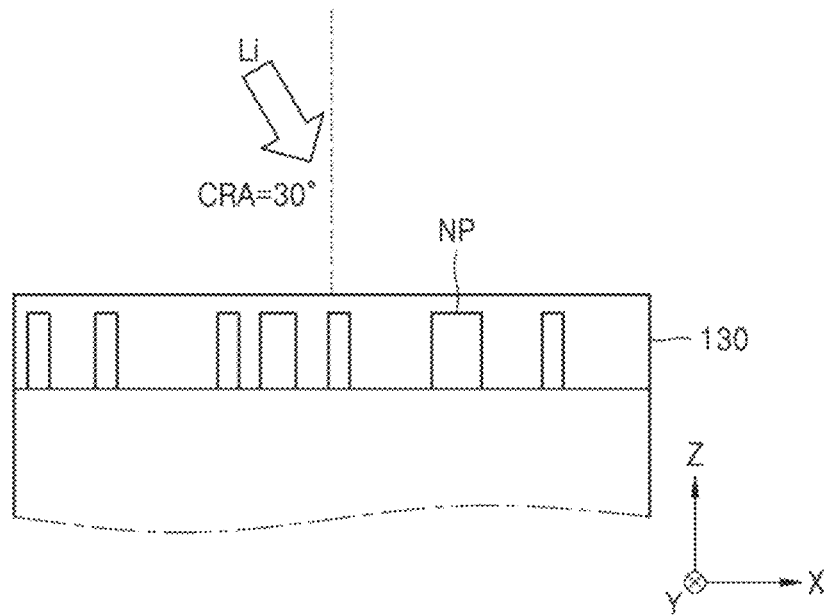
FIG. 16A is a cross-sectional view illustrating a color separating lens array including a plurality of nano-posts.
Figure 16B:
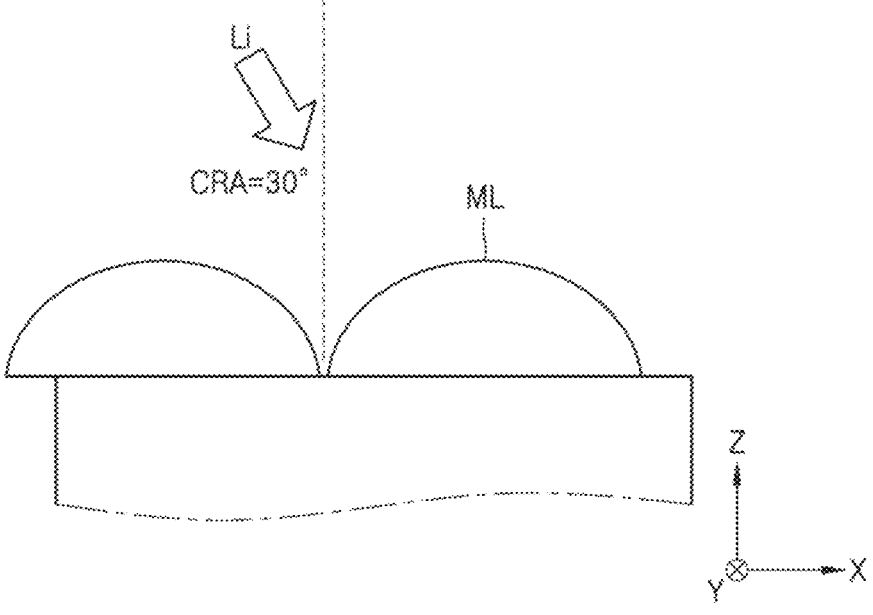
FIG. 16B is a cross-sectional view illustrating a micro lens corresponding to the cross-sectional view of FIG. 16A according to an embodiment.

FIG. 16A is a cross-sectional view illustrating the color separating lens array 130 including the plurality of nano-posts NP according to an embodiment. FIG. 16B is a cross-sectional view illustrating the micro lens ML corresponding to the cross-sectional view of FIG. 16A according to an embodiment.

Although FIGS. 16A and 16B are respectively cross-sectional views of only the color separating lens array 130 and the micro lens ML, it may be seen from the foregoing that the photosensitive cell, the spacer layer, and the color filter described above may be located below each of the color separating lens array 130 and the micro lens ML. The photosensitive cell, the spacer layer, and the color filter have been described above, and thus, repeated descriptions thereof may be omitted.

FIG. 16A illustrates the plurality of nano-posts NP located at the periphery of the color separating lens array 130. As described above, a CRA of the incident light Li at the periphery of the color separating lens array 130 may be greater than a CRA of the incident light Li at the center of the color separating lens array 130. For example, the CRA of the incident light Li at the center of the color separating lens array 130 may be 30 degrees. This is an example, and as described above, the CRA may increase away from the center of the color separating lens array 130 (that is, from the center of the color separating lens array 130 to the periphery thereof).

Referring to FIG. 16A together with FIG. 14A, the plurality of nano-posts NP located at the periphery of the color separating lens array 130 may be shifted for efficient color separation in a direction opposite to the first direction (X direction) (that is, toward the center of the image sensor). However, since an arrangement pattern of nano-posts included in a first sub region and nano-posts adjacent to the first sub region and an arrangement pattern of nano-posts included in a fourth sub region and nano-posts adjacent to the fourth sub region may be different from each other in the same unit region, the intensity of a first green pixel signal and the intensity of a second green pixel signal may be different from each other. This is described below with reference to FIG. 17A.

FIG. 16B illustrates the micro lens ML located at the periphery of an image sensor corresponding to the periphery of the color separating lens array 130 of FIG. 16A. As described above, a CRA of the incident light Li incident on the micro lens ML at the periphery of the image sensor may be 30 degrees greater than a CRA at the center of the image sensor.

Referring to FIG. 16B together with FIG. 14B, as the CRA increases, the micro lens ML at the periphery of the image sensor may be shifted in a direction opposite to the first direction (X direction) (that is, toward the center of the image sensor).

Figure 17A:
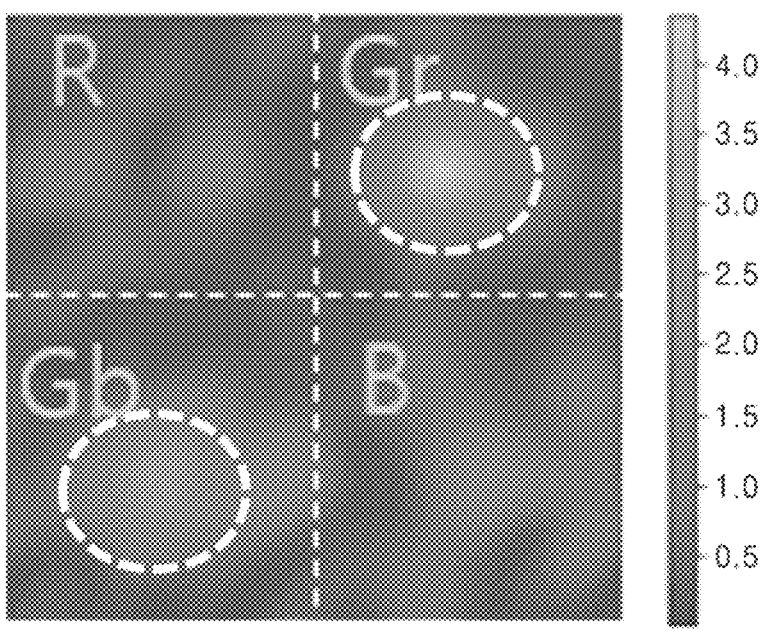
FIG. 17A is a diagram illustrating an intensity of light condensed on a photosensitive cell by a color separating lens array according to an embodiment.
Figure 17B:
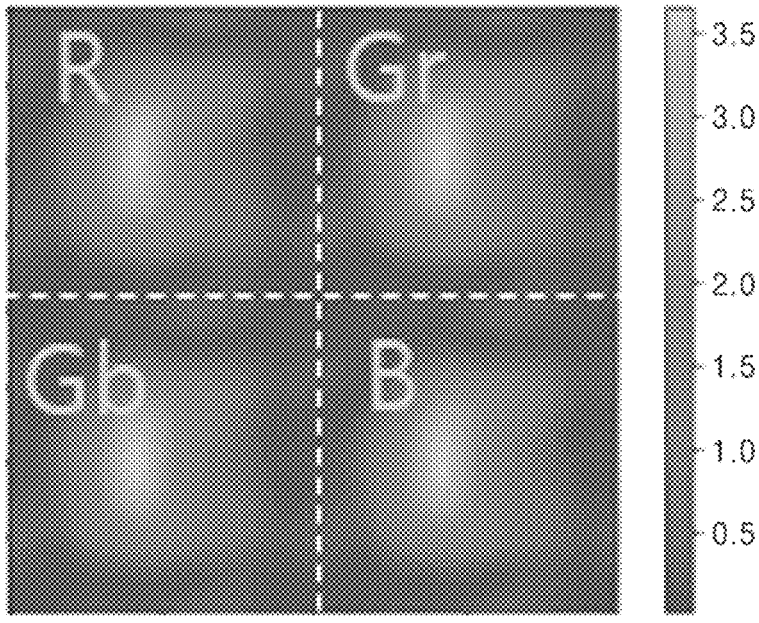
FIG. 17B is a diagram illustrating an intensity of light condensed on the photosensitive cell by a micro lens according to an embodiment.

FIG. 17A is a diagram illustrating the intensity of light condensed on a photosensitive cell by a color separating lens array according to an embodiment. FIG. 17B is a diagram illustrating the intensity of light condensed on the photosensitive cell by a micro lens according to an embodiment.

FIGS. 17A and 17B illustrate the intensity of condensed on the photosensitive cell by the color separating lens array of FIG. 154A and the micro lens of FIG. 15B, respectively.

FIG. 17A illustrates the intensity of green light condensed on photosensitive cells respectively corresponding to the first green pixel Gr, the red pixel R, the blue pixel B, and the second green pixel Gb at the periphery of the color separating lens array.

Referring to FIG. 17A, as described above, at the periphery of the color separating lens array, the intensity of the green light condensed on the photosensitive cells corresponding to the first green pixel Gr and the second green pixel Gb is greater than the intensity of the green light condensed on the photosensitive cells corresponding to the red pixel R and the blue pixel B.

However, a difference between the intensity of the green light condensed on the photosensitive cell corresponding to the first green pixel Gr and the intensity of the green light condensed on the photosensitive cell corresponding to the second green pixel Gb in FIG. 17A may be greater than a difference in FIG. 15A. That is, according to an increase in a CRA of incident light at the periphery of the color separating lens array compared to the center of the color separating lens array, the difference between the intensity of the green light condensed on the photosensitive cell corresponding to the first green pixel Gr and the intensity of the green light condensed on the photosensitive cell corresponding to the second green pixel Gb may increase.

An arrangement pattern of a plurality of nano-posts included in a first sub region corresponding to the first green pixel Gr and regions adjacent to the first sub region is rotated by 90 degrees with respect to an arrangement pattern of a plurality of nano-posts included in a fourth sub region corresponding to the second green pixel Gb and regions adjacent to the fourth sub region. Therefore, since the two arrangement patterns are different from each other, according to the increase in the CRA, the difference between the intensity of the green light condensed on the photosensitive cell corresponding to the first green pixel Gr and the intensity of the green light condensed on the photosensitive cell corresponding to the second green pixel Gb may increase. Therefore, the intensity of a first green pixel signal generated based on the green light condensed on the photosensitive cell corresponding to the first green pixel Gr and the intensity of a second green pixel signal generated based on the green light condensed on the photosensitive cell corresponding to the second green pixel Gb may be different at the periphery of the color separating lens array.

FIG. 17B illustrates the intensity of green light condensed on photosensitive cells respectively corresponding to the first green pixel Gr, the red pixel R, the blue pixel B, and the second green pixel Gb by the micro lens at the periphery of an image sensor.

Referring to FIG. 17B, at the periphery of the image sensor, the intensity of the green light condensed on the photosensitive cells respectively corresponding to the first green pixel Gr and the second green pixel Gb may be similar to the intensity of the green light condensed on the photosensitive cells respectively corresponding to the red pixel R and the blue pixel B by the micro lens, and, even though the CRA increases at the periphery of the micro lens, the intensity of the green light condensed on the photosensitive cells respectively corresponding to the first green pixel Gr and the second green pixel Gb may be similar.

Figure 18:
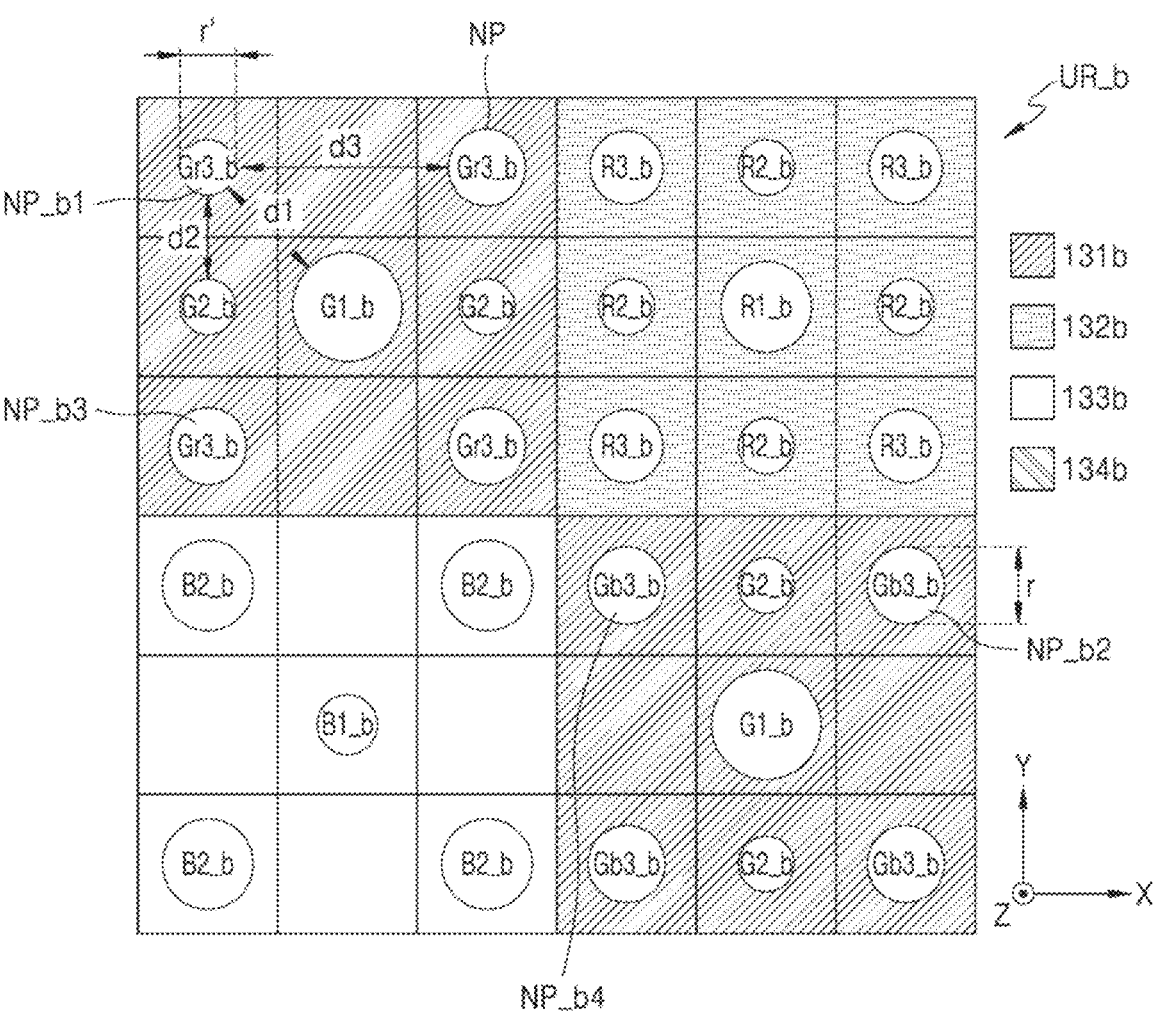
FIG. 18 is a plan view illustrating a unit region included in a color separating lens array according to an embodiment.

FIG. 18 is a plan view illustrating a unit region UR_b included in a color separating lens array according to an embodiment.

FIG. 18 illustrates the unit region UR_b located at the periphery (i.e., away from) of the color separating lens array among a plurality of unit regions included in the color separating lens array according to embodiments. Therefore, the unit region UR_b may be referred to as a peripheral unit region. Accordingly, the first sub region 131a may be referred to as a first peripheral sub region, the second sub region 132a may be referred to as a second peripheral sub region, the third sub region 133a may be referred to as a third peripheral sub region, and the fourth sub region 134a may be referred to as a fourth peripheral sub region.

The unit region UR_b may include a first sub region 131b, a second sub region 132b, a third sub region 133b, and a fourth sub region 134b, and the first sub region 131b, the second sub region 132b, the third sub region 133b, and the fourth sub region 134b may each include the plurality of nano-posts NP. Sizes and an arrangement form of the plurality of nano-posts NP included in each of the first sub region 131b, the second sub region 132b, the third sub region 133b, and the fourth sub region 134b may be similar as those described with reference to FIG. 7, and thus, repeated descriptions thereof may be omitted. The first sub region 131b, the second sub region 132b, the third sub region 133b, and the fourth sub region 134b included in the unit region UR_b may respectively correspond to the first green pixel (Gr in FIG. 2), the red pixel (R in FIG. 2), the blue pixel (B in FIG. 2), and the second green pixel (Gb in FIG. 2).

As described herein, FIG. 13 depicts a unit region UR_a located at or near a center of a color separating lens array, and FIG. 18 depicts a unit region UR_b located in the periphery of a color separating lens array (e.g., away from the center of the color separating lens array). Referring to FIGS. 13 and 18, the nano-post Gr3_a may be included in the first sub region 131a of the unit region UR_a that is located at the center of the color separating lens array and the nano-post Gr3_b may be included in the first sub region 131b in the unit region UR_b that is located at the periphery of the color separating lens array, such that nano-post Gr3_a and Gr3_b may have corresponding functionality. Similarly, a plurality of nano-posts included in a unit region located at the center of the color separating lens array may have respectively corresponding functionality to a plurality of nano-posts included in the unit region UR_b located at the periphery of the color separating lens array. Put alternatively, nano-post Gr3_a in region 131a and nano-post Gr3_b in region 131b may have similar functionality in their respective unit regions, but may have different dimensional parameters based on their respective location from the center of the color separating lens array.

The corresponding nano-posts may be defined by their relative positions with adjacent nano-posts. For example, In FIG. 13, nano-posts G2_a, R3_a, B2_a, and Gb3_a are adjacent in the first direction (X direction) or the second direction (Y direction) with respect to the nano-post Gb3_a. In FIG. 18, nano-posts G2_b, R3_b, B2_b, and Gb3_b are adjacent in the first direction (X direction) or the second direction (Y direction) with respect to the nano-post Gb3_b located on the periphery of the color separating lens array. For convenience of explanation, the nano-posts adjacent in the first direction (X direction) and the second direction (Y direction) are mainly described in the above-described example, but the corresponding nano-post may also be defined according to relative positions of nano-posts adjacent in a direction between the first direction (X direction) and the second direction (Y direction), that is, in a diagonal direction.

As described above, in order to reduce or prevent a difference in the intensity between a first green pixel signal and a second green pixel signal and to correct a color, the color separating lens array according to embodiments may include corresponding nano-posts having different cross-sectional areas. Referring to FIGS. 13 and 18, cross-sectional areas of nano-posts NP_b3 and NP_b4 respectively included in the first sub region 131b and the fourth sub region 134b included in the one unit region UR_b may be of the same size and shape as those in the one unit region UR_a. On the other hand, a diameter r' of a nano-post NP_b1 included in the first sub region 131b may be different from the diameter r of a nano-post NP_b2 included in the fourth sub region 134b. For example, the diameter of the nano-post NP_b2 included in the fourth sub region 134b may be r, and the diameter r' of the nano-post NP_b1 included in the first sub region 131b may be less than the diameter r of the nano-post Gb3_b included in the fourth sub region 134b. Accordingly, the cross-sectional areas of the nano-post Gr3_b and the nano-post Gb3_b respectively located in the first sub region 131b and the fourth sub region 134b included in the one unit region UR_b may be different from each other.

In addition, the cross-sectional area of at least one of the nano-posts (e.g., Gr3_a in FIG. 13) may be different from the cross-sectional areas of at least one of the nano-posts (e.g., Gr3_b in FIG. 18) located at the periphery of the color separating lens array and corresponding thereto. In FIGS. 13 and 18, cross-sectional areas of the nano-posts NP corresponding each other included in a fourth sub region 134a and a fourth sub region 134b are shown to be the same. However, this is for convenience of description, and the present disclosure is not limited thereto. For example, at least one of the nano-posts NP included in a fourth sub region 134b may have a different cross-sectional area from the corresponding nano-post NP included in a fourth sub region 134a.

In FIGS. 13 and 18, the cross-sectional area of one corresponding nano-post is described as being different, but the disclosure is not limited thereto. A unit region located at each of the center and the periphery of one color separating lens array may include M nano-posts, and a cross-sectional area of each of N nano-posts among the M nano-posts included in the unit region located at the center may be different from a cross-sectional area of each of the corresponding N nano-posts included in the unit region located at the periphery. M may be an integer that is 1 or more, and N may be an integer that is 1 or more and is M or less.

In addition, in FIGS. 13 and 18, the cross-sectional area of the nano-post located at the periphery of the color separating lens array is described as being smaller than the cross-sectional area of the nano-post located at the center of the color separating lens array, but this is an example, and the cross-sectional area of the nano-post located at the periphery may be larger than the cross-sectional area of the corresponding nano-post located at the center. Furthermore, the cross-sectional area of the corresponding nano-post may gradually increase or decrease from the center to the periphery of the color separating lens array according to the disclosure. For example, the cross-sectional area of the corresponding nano-post may gradually increase or decrease from the center to the periphery of the color separating lens array in proportion to a distance from the center.

Referring to FIGS. 13 and 18 together, the nano-posts NP_b1 included in the first sub region 131b may be spaced apart from each of the three adjacent nano-posts G1_b, G2_b, and Gr3_b at distances d1, d2, and d3, respectively. For convenience of description, spaces between nano-posts is shown as the shortest distance between nano-posts, but the spaces between nano-posts may refer to distances between the centers of adjacent nano-posts.

Referring to FIG. 18, as described above, the cross-sectional area of the nano-post NP_b1 included in the first sub region 131b is different from the cross-sectional area of the corresponding nano-post NP_b2 included in the fourth sub region 134b in the same unit region UR_b. Therefore, at the periphery of the color separating lens array according to embodiments, an arrangement pattern of the plurality of nano-posts G1_b, G2_b, and Gr3_b included in the first sub region 131b is similar to an arrangement pattern of the plurality of nano-posts G1_b, G2_b, and Gr3_b included in the fourth sub region 134b that is rotated by 90 degrees, but may not be the same.

The embodiment in which the cross-sectional areas of the corresponding nano-posts Gr3_a and Gr3_b located in the first sub regions 131a and 131b are different has been described with reference to FIGS. 13 and 18, but the disclosure is not limited thereto. As described with reference to FIG. 8A, green light condensed on photosensitive cells corresponding to a first green pixel and a second green pixel may be condensed by nano-posts located in second and third sub regions. Therefore, cross-sectional areas and distances of nano-posts located in the first and fourth sub regions respectively corresponding to the first green pixel and the second green pixel, and the nano-posts included in the second and third sub regions may be adjusted to reduce or prevent a difference between the intensity of the green pixel signal and the intensity of the second green pixel signal. For example, referring to FIGS. 13 and 18, the cross-sectional area of the nano-post R3_a included in the second sub region 132a and the cross-sectional area of the corresponding nano-post R3_b included in the second sub region 132b may be different from each other. Similarly, the cross-sectional area of the nano-post B2_a included in the third sub region 133a and the cross-sectional area of the corresponding nano-post B2_b included in the second sub region 132b may be different from each other.

That is, a cross-sectional area of at least one nano-post among the plurality of nano-posts in a unit region located at the center of the color separating lens array may be different from a cross-sectional area of a nano-post located in a unit region at the periphery of the color separating lens array and corresponding to the at least one nano-post. Furthermore, a cross-sectional area of a nano-post in which a difference between the first green pixel signal and the second green pixel signal is the minimum according to the CRA is found. Thus, a difference between the first green pixel signal and the second green pixel signal generated based on incident light passing through the color separating lens array may be minimized.

Figure 19A:
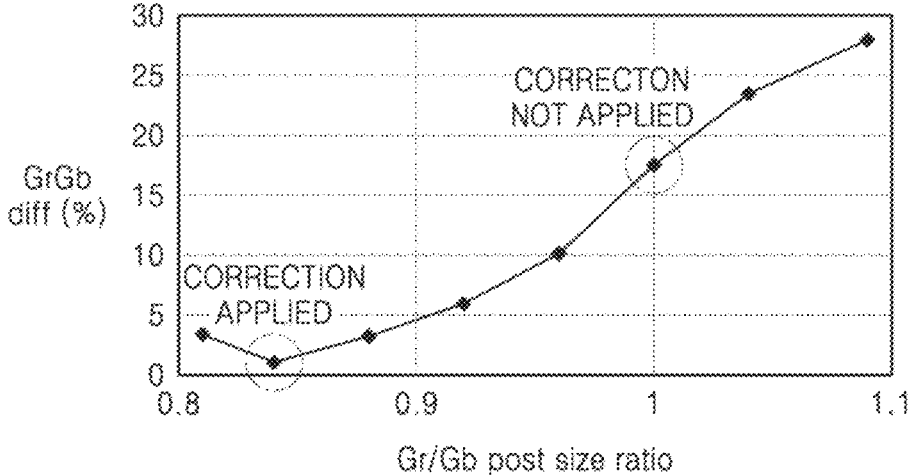
FIG. 19A is a graph illustrating a difference between a first green pixel signal and a second green pixel signal with respect to a nano-post cross-sectional area ratio according to an embodiment.
Figure 19B:
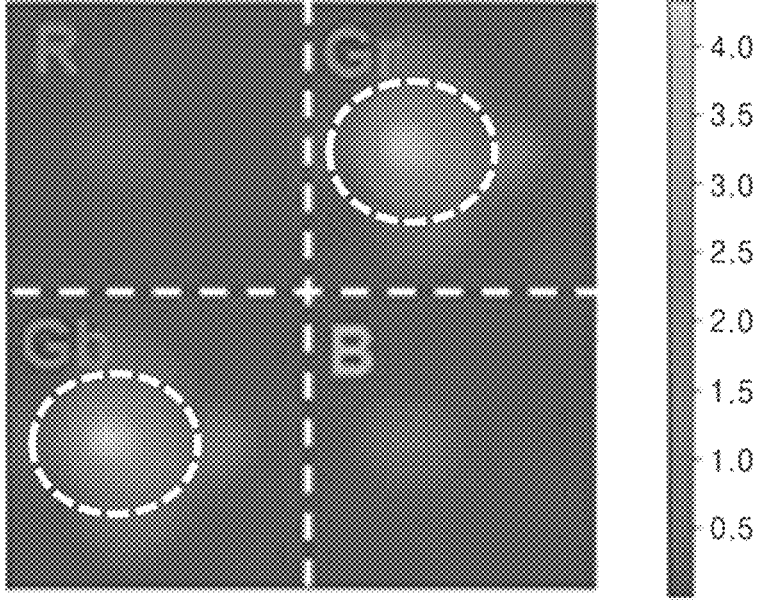
FIG. 19B is a diagram illustrating an intensity of light condensed on a photosensitive cell by a color separating lens array according to an embodiment.

FIG. 19A is a graph illustrating a difference between a first green pixel signal and a second green pixel signal with respect to a nano-post cross-sectional area ratio according to an embodiment. FIG. 19B is a diagram illustrating the intensity of light condensed on a photosensitive cell by a color separating lens array according to an embodiment.

FIG. 19A is the graph illustrating the difference between the first green pixel signal and the second green pixel signal with respect to the cross-sectional area ratio of a nano-post included in a first sub region and the corresponding nano-post included in a fourth sub region, in one unit region located at the periphery of the color separating lens array having a CRA of 34 degrees.

Referring to FIG. 19A, when the cross-sectional area of the corresponding nano-post is not corrected, the cross-sectional area of the corresponding nano-post may be the same (as in FIG. 13). Therefore, the cross-sectional area ratio of the two corresponding nano-posts may be 1. The difference between the first green pixel signal and the second green pixel signal is about 17%. When the cross-sectional area ratio of the corresponding nano-post is corrected to about 0.83, the difference between the first green pixel signal and the second green pixel signal may be minimized. For example, the cross-sectional area ratio of the corresponding nano-posts Gr3_b and Gb3_b included in the unit region UR_b of FIG. 18 may be $$\frac{(r')^2}{(r)^2},$$

and when the cross-sectional area ratio $$\frac{(r')^2}{(r)^2}$$

is 0.83, a difference (GrGb diff) between the intensity of the first green pixel signal and the intensity of the second green pixel signal respectively corresponding to the first sub region 131*b* and the second sub region 132*b* of FIG. 18 may be at a minimum. The difference (GrGb diff) between the intensity of the first green pixel signal and the intensity of the second green pixel signal may refer to a percentage obtained by dividing the difference between the first green pixel signal and the second green pixel signal by an average of the first green pixel signal and the second green pixel signal. The difference (GrGb diff) between the first green pixel signal and the second green pixel signal may be obtained through Equation (2) below.

$$GrGbdiff = \frac{|S1 - S2|}{(S1 + S2)/2} \times 100 \qquad (2)$$

$S1$ denotes the intensity of the first green pixel signal, and $S2$ denotes the intensity of the second green pixel signal.

Therefore, the color separating lens array according to embodiments may correct the cross-sectional area ratio of the nano-posts included in one unit region according to a CRA or a position on the color separating lens array, thereby minimizing the difference between the green pixel signal and the second green pixel signal according to the CRA or the position on the color separating lens array.

FIG. 19B illustrates a first green pixel signal and a second green pixel signal generated by the color separating lens array in which the cross-sectional area ratio of the corresponding nano-post included in one unit region is corrected according to FIG. 19A. Referring to FIG. 19B together with FIG. 17A, the difference between the intensity of the first green pixel signal and the second green pixel signal may be reduced or prevented by correcting the cross-sectional area ratio of the corresponding nano-post included in one unit region.

Figure 20:
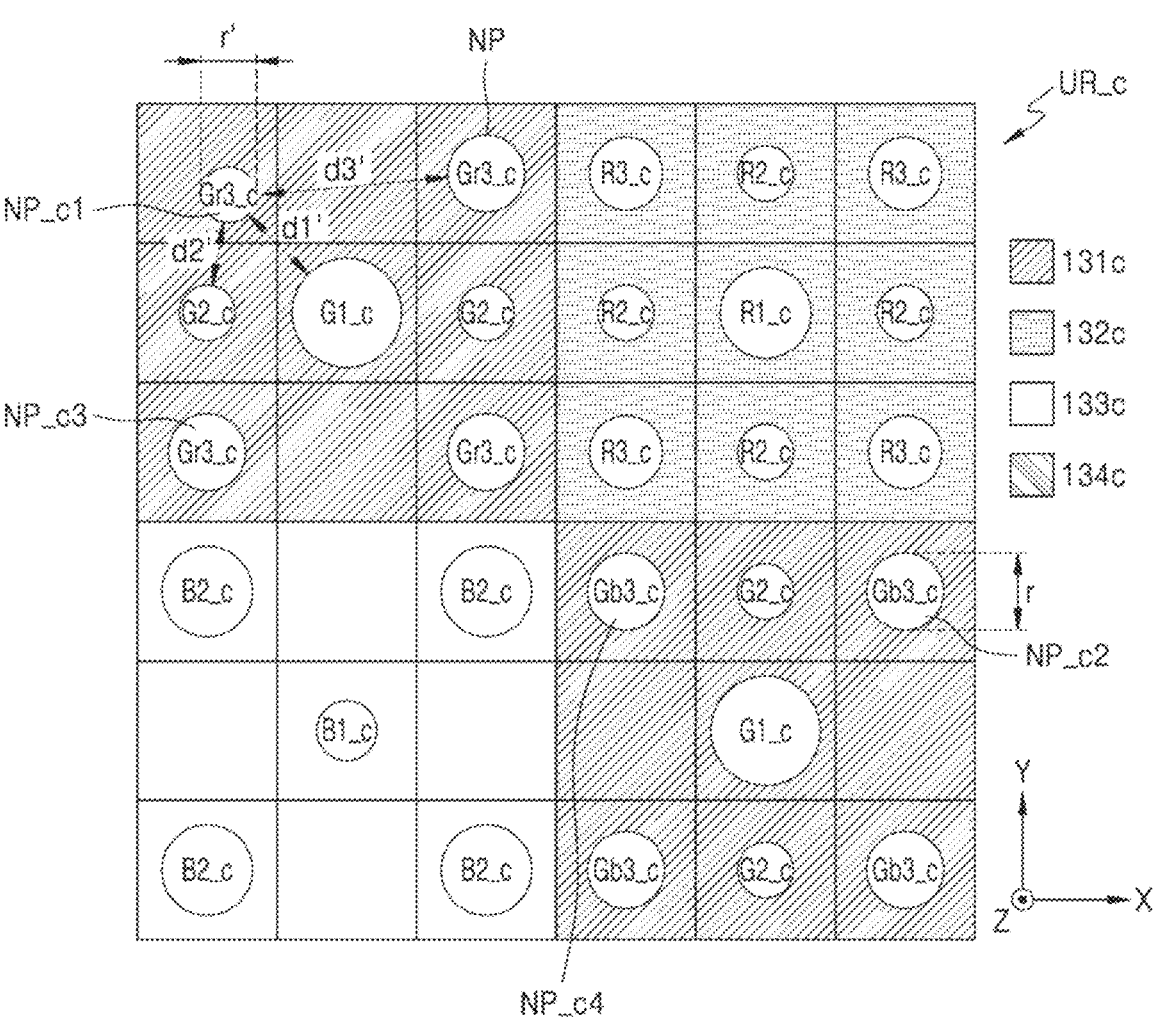
FIG. 20 is a plan view illustrating a unit region included in a color separating lens array according to an embodiment.

FIG. 20 is a plan view illustrating a unit region included in a color separating lens array according to an embodiment.

FIG. 20 illustrates a unit region UR_c located at the periphery of the color separating lens array among a plurality of unit regions included in the color separating lens array according to the disclosure.

The unit region UR_c may include a first sub region 131*c*, a second sub region 132*c*, a third sub region 133*c*, and a fourth sub region 134*c*, and the first sub region 131*c*, the second sub region 132*c*, the third sub region 133*c*, and the fourth sub region 134*c* may each include the plurality of nano-posts NP. Sizes and an arrangement form of the plurality of nano-posts NP included in each of the first sub region 131*c*, second sub region 132*c*, third sub region 133*c*, and fourth sub region 134*c* may be similar as those described with reference to FIG. 7, and thus, repeated descriptions thereof may be omitted. The first sub region 131*c*, the second sub region 132*c*, the third sub region 133*c*, and the fourth sub region 134*c* included in the unit region UR_c may respectively correspond to the first green pixel (Gr in FIG. 2), the red pixel (R in FIG. 2), the blue pixel (B in FIG. 2), and the second green pixel (Gb in FIG. 2).

Referring to FIG. 20, in the same manner as in FIG. 18, the diameter r' of a nano-post NP_c1 included in the first sub region 131*c* may be different from the diameter r of a nano-post NP_c2 included in the fourth sub region 134*c* and corresponding thereto. For example, the diameter of the nano-post NP_c2 included in the fourth sub region 134*c* may be r, and the diameter r' of the nano-post NP_c1 included in the first sub region 131*c* may be less than the diameter r of the nano-post NP_c2 included in the fourth sub region 134*c*. Accordingly, the cross-sectional area of the nano-post NP_c1 included in the first sub region 131*c* may be smaller than the cross-sectional area of the corresponding nano-post NP_c2 included in the fourth sub region 134*c*.

Referring to FIGS. 18 and 20 together, the diameter r' of the nano-post NP_c1 corresponding to the nano-post Gr3_*b* is the same as that of the nano-post NP_b1, but distances between the nano-posts NP adjacent to the nano-post NP_c1 may be different from distances between the nano-posts NP adjacent to the nano-post NP_b1. Differently from the distances d1, d2, and d3 between the three nano-posts G1_*b*, G2_*b*, and Gr3_*b* adjacent to the nano-post NP_b1 included in the first sub region 131*b*, the nano-post NP_c1 included in the first sub region 131*c* may be spaced apart from each of three nano-posts G1_*c*, G2_*c*, and Gr3_*c* at distances d1', d2', and d3', respectively.

That is, the cross-sectional area of a nano-post and distances between adjacent nano-posts may also be different according to a CRA of incident light or a position on the color separating lens array. Therefore, at the periphery of the color separating lens array according to embodiments, an arrangement pattern of the plurality of nano-posts G1_*c*, G2_*c*, and Gr3_*c* included in the first sub region 131*c* is similar to an arrangement pattern of the plurality of nano-posts G1_*c*, G2_*c*, and Gr3_*c* included in the fourth sub region 134*c* that is rotated by 90 degrees, but may not be the same.

That is, a cross-sectional area of at least one nano-post among the plurality of nano-posts located at the center of the color separating lens array may be different from a cross-sectional area of a nano-post located at the periphery of the color separating lens array. Furthermore, the cross-sectional area of the rotationally corresponding nano-post and the distances between adjacent nano-posts may be adjusted differently according to the CRA or the position on the color separating lens array. A cross-sectional area of a nano-post in which a difference between a first green pixel signal and a second green pixel signal is the minimum according to the CRA and the distances between nano-posts are found, and thus, a difference between the first green pixel signal and the second green pixel signal generated based on incident light passing through the color separating lens array may be minimized.

Furthermore, the cross-sectional area of the rotationally corresponding nano-post may gradually increase or decrease from the center to the periphery of the color separating lens array according to embodiments. For example, the cross-sectional area of the rotationally corresponding nano-post may gradually increase or decrease from the center to the periphery of the color separating lens array in proportion to a distance from the center.

For convenience of explanation, distances between the nano-posts NP included in the first sub region 131*c* are expressed as being adjusted in FIG. 20, but this is an example, and distances between at least one nano-post among a plurality of nano-posts located at the center of the color separating lens array according to embodiments and nano-posts adjacent to the at least one nanopost may be designed to be different from distances between a nanopost located at the periphery and corresponding thereto and nanoposts adjacent to the nanopost.

Figure 21:
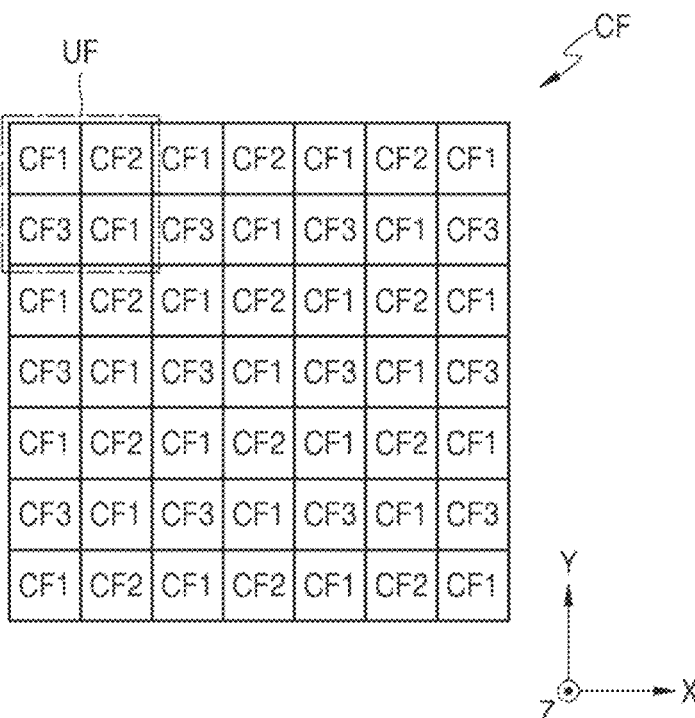
FIG. 21 is a plan view illustrating a color filter according to an embodiment.

FIG. 21 is a plan view illustrating a color filter according to an embodiment.

FIG. 21 illustrates a color filter CF in which unit filters UF each including an arrangement of two first filter regions CF1, one second filter region CF2, and one third filter region CF3 in a 2×2 shape are repeatedly disposed in a two-dimensional plane.

The first color filter CF1, the second color filter CF2, and the third color filter CF3 may be similar as those described with reference to FIGS. 11A and 11B, and thus, repeated descriptions thereof may be omitted.

As described above, the CRA may increase away from the center of the color separating lens array, and the difference between the intensity of the first green pixel signal and the intensity of the second green pixel signal may increase. In addition, based on the CRA of incident light that increases toward the periphery of the color separating lens array and the arrangement pattern of different nano-posts in the first and fourth sub regions included in one unit region, colors of the center and the periphery of an image generated by light passing through the color separating lens array may be different from each other. An image sensor according to the disclosure may reduce or prevent the above problem by providing the color filter CF including filter regions having different areas at the center and the periphery thereof.

FIGS. 22A, 22B, 22C, and 22D are plan views illustrating unit color filters according to an embodiment.

FIGS. 22A, 22B, 22C, and 22D respectively illustrate unit filter regions UF_a UF_b, UF_c, and UF_d.

Figure 22A:
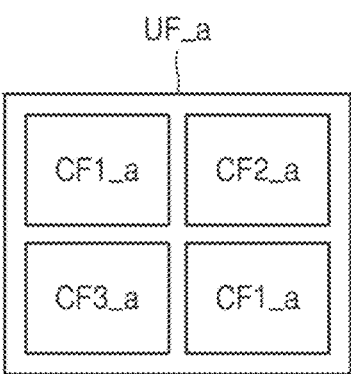
FIGS. 22A, 22B, 22C, and 22D are plan views illustrating unit color filters according to an embodiment.

Referring to FIG. 22A, the unit filter region UF_a may include two first filter regions CF1_a, one second filter region CF2_a, and one third filter region CF3_a. The two first filter regions CF1_a, the one second filter region CF2_a, and the one third filter region CF3_a included in the unit filter region UF_a may have the same area. The first filter region CF1_a may pass green light therethrough, the second filter region CF2_a may pass red light therethrough, and the third filter region CF3_a may pass blue light therethrough.

The amount of light in a specific wavelength range passing through one unit filter region may be proportional to areas of a plurality of filter regions included in the unit filter region. For example, referring to FIG. 22A, since the area of the first filter region CF1_a is twice the area of the second filter region CF2_a and the area of the third filter region CF3_a, the amount of green light that passes through which the unit filter region UF_a may be twice the amount of red light and blue light that pass through the unit filter region UF_a.

Figure 22B:
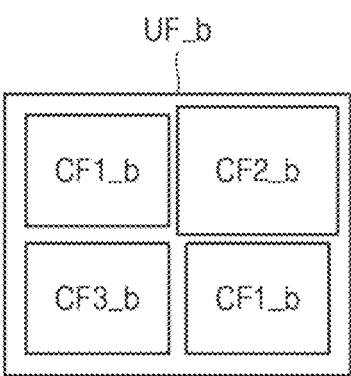

Referring to FIG. 22B, the unit filter region UF_b may include two first filter regions CF1_b, one second filter region CF2_b, and one third filter region CF3_b. The two first filter regions CF1_b and the one third filter region CF3_b included in the unit filter region UF_b may have the same area, and an area of the one second filter region CF2_b may be greater than the area of each of the two first filter regions CF1_b and the one third filter region CF3_b. Accordingly, a ratio of red light to the total light passing through the unit filter region UF_b may be greater than a ratio of red light to the total light passing through the unit filter region UF_a of FIG. 22A.

Figure 22C:
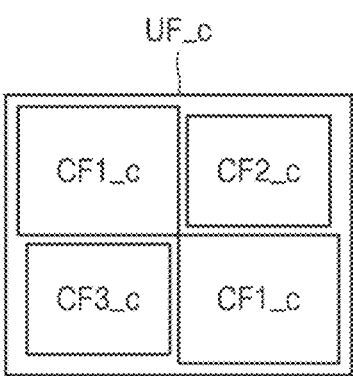

Referring to FIG. 22C, the unit filter region UF_c may include two first filter regions CF1_c, one second filter region CF2_c, and one third filter region CF3_c. The one second filter region CF2_b and the one third filter region CF3_c included in the unit filter region UF_c may have the same area, and an area of each of the two first filter regions CF1_c may be greater than the area of each of the one second filter region CF2_b and the one third filter region CF3_c. Accordingly, a ratio of green light to the total light passing through the unit filter region UF_c may be greater than the ratio of green light to the total light passing through the unit filter region UF_a of FIG. 22A. However, the two first filter regions CF1_cin FIG. 22C are examples, and the disclosure is not limited thereto. For example, an area of one of two first filter regions included in a unit filter region may be larger than an area of the other first filter region.

Figure 22D:
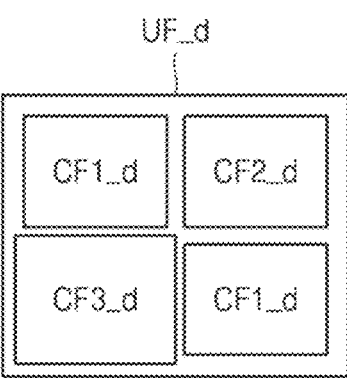

Referring to FIG. 22D, the unit filter region UF_d may include two first filter regions CF1_d, one second filter region CF2_d, and one third filter region CF3_d. The two first filter regions CF1_d and the one second filter region CF2_d included in the unit filter region UF_d may have the same area, and an area of the one third filter region CF3_d may be greater than the area of each of the two first filter regions CF1_d and the one second filter region CF2_d. Accordingly, a ratio of blue light to the total light passing through the unit filter region UF_d may be greater than the ratio of blue light to the total light passing through the unit filter region UF_a of FIG. 22A.

As described above with reference to FIG. 21, since the CRA increases away from the center of the color separating lens array increases, colors of the center and the periphery of an image generated by light passing through the color separating lens array may be different from each other. Therefore, as described above, an image sensor according to embodiments may include a color separating lens array in which cross-sectional areas of the corresponding nano-posts are different from each other. Furthermore, the image sensor according to embodiments includes a color filter including at least one unit filter region including at least one filter region having a different area among four filter regions disposed in a 2×2 shape between a sensor substrate and the color separating lens array, and thus, a color difference between the center and periphery of the image may be reduced or prevented. When the color difference occurs between the center and the periphery of the image, additional image processing (e.g., in the processor 2200 of FIG. 3) may be required to correct the color difference, which may result in additional power consumption.

The color filter CF in FIG. 21 according to embodiments may have different areas of a specific filter region at the periphery and the center in order to reduce or prevent the color difference between the center and the periphery of the image. For example, an image generated corresponding to the center of the color separating lens array may have a red color, while an image generated corresponding to the periphery of the color separating lens array may have a green color. In this case, a unit filter region located at the center of the color filter CF to correct the color of the center of the image to the green color may be the unit filter region UF_c of FIG. 22C. Alternatively, a unit filter region located at the periphery of the color filter CF to correct the color of the periphery of the image to the red color may be the unit filter region UF_b of FIG. 22B.

As described above, the color filter CF in FIG. 21 according to embodiments may have different areas of the specific filter region at the periphery and the center in order to reduce or prevent the color difference between the center and the periphery of the image, and the area of the specific filter region may be proportional or inversely proportional to a distance from the center of the image sensor. For example, an area of the second filter region CF2 in FIG. 21 located at the center of the image sensor may be larger or smaller than an area of each of the plurality of second filter regions CF2 in FIG. 21 located at regions other than the center of the image sensor.

Figures 23, 24:
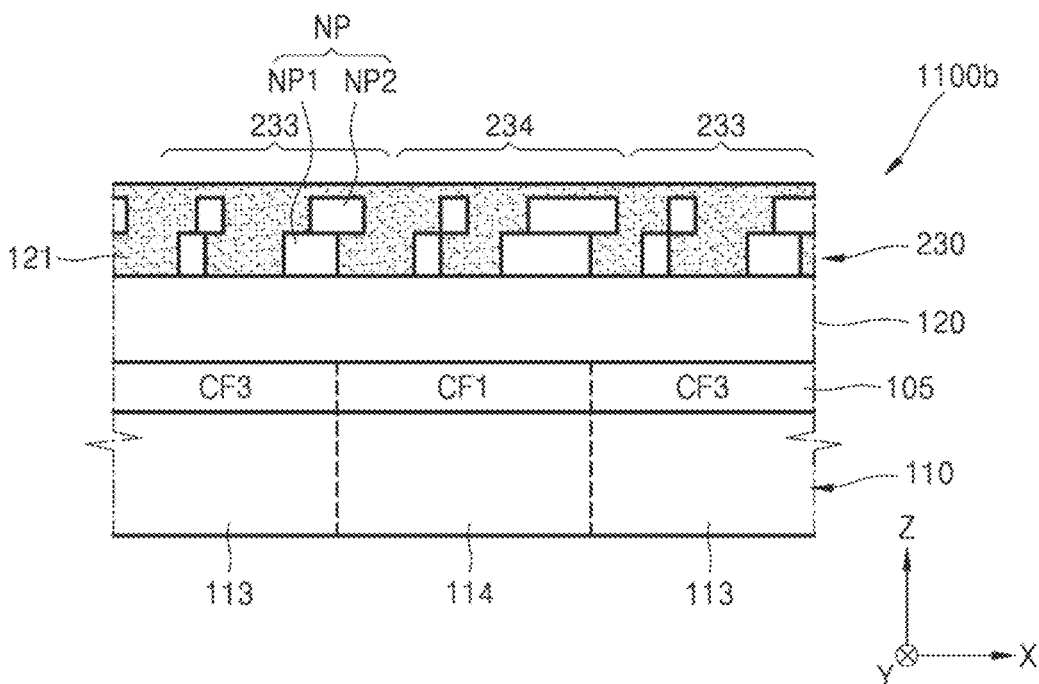
FIG. 23 is a cross-sectional view illustrating a pixel array of an image sensor according to an embodiment.
FIG. 24 is a block diagram illustrating an electronic device including an image sensor according to an embodiment.

FIG. 23 is a cross-sectional view of a pixel array 1100b of image sensor 1000 according to an embodiment.

Referring to FIG. 23, the pixel array 1100*b* of the image sensor of the embodiment is different from the above-described embodiments in that the pixel array 1100*b* includes a color separating lens array 230 including the nano-posts NP stacked in two stages. The nano-post NP may include a first nano-post NP1 disposed on the spacer layer 120, and a second nano-post NP2 disposed above the first nano-post NP1 in the third direction (Z direction). The second nano-post NP2 may be shifted in a direction of incident light with respect to the first nano-post NP1. For example, when light incident on the color separating lens array 230 is inclined from the right to the left, the second nano-post NP2 may be shifted to the right with respect to the first nano-post NP1. Conversely, when the light incident on the color separating lens array 230 is inclined from the left to the right, the second nano-post NP2 may be shifted to the left with respect to the first nano-post NP1.

In addition, considering a CRA of light incident on the image sensor 1000 shown in FIG. 2, the second nano-post NP2 may be shifted toward the center of the image sensor 1000 with respect to the first nano-post NP1. For example, the second nano-post NP2 may be shifted further to the right with respect to the first nano-post NP1 as moving from the center of the image sensor 1000 to the left periphery, and may be shifted further to the left with respect to the first nano-post NP1 as moving from the center of the image sensor 1000 to the right periphery.

Likewise, a third sub region 233 and a fourth sub region 234 of the color separating lens array 230 may be shifted toward the center of the image sensor 1000 with respect to a blue pixel (or a third photosensitive cell) and a second green pixel (or a fourth photosensitive cell) respectively corresponding thereto. For example, the third sub region 233 and fourth sub region 234 of the color separating lens array 230 may be shifted further to the right with respect to the blue pixel and the second green pixel respectively corresponding thereto as moving from the center of the image sensor 1000 to the left periphery. A first sub region and a second sub region disposed on another cross-section of the color separating lens array 230 in the second direction (Y direction) may also be shifted toward the center of the image sensor 1000 with respect to a first green pixel (or a first photosensitive cell) and a red pixel (or a second photosensitive cell) respectively corresponding thereto.

In particular, the third sub region 233 and the fourth sub region 234 of the color separating lens array 230 may be shifted to respectively condense blue light and green light at the center of the third photosensitive cell 113 and the center of the fourth photosensitive cell 114 respectively corresponding thereto.

A cross-sectional area of at least one nano-post located at the center of the color separating lens array may be different from a cross-sectional area of a nano-post corresponding to the at least one nano-post and located at the periphery of the color separating lens array. The nano-posts respectively located at the center and the periphery of the color separating lens array and corresponding to each other may include a first nano-post and a second nano-post, and may have different cross-sectional areas from at least one of the first nano-post and the second nano-post.

FIG. 24 is a block diagram illustrating an electronic device including an image sensor 1000 according to an embodiment.

The electronic device may include the image sensor 1000, a processor 2200, a memory 2300, a display device 2400, and a bus 2500. The image sensor 1000 may obtain image information about an external subject under the control of the processor 2200 and may provide the image information to the processor 2200. As described above, the image sensor 1000 may include a color separating lens array, and the color separating lens array included in the image sensor 1000 may include one or more corresponding nano-posts having different cross-sectional areas to reduce or prevent a difference between the intensity of a first green pixel signal and the intensity of a second green pixel signal.

The processor 2200 may store the image information provided from the image sensor 1000 in the memory 2300 via the bus 2500, and output the image information stored in the memory 2300 to the display device 2400 to display the image information to a user. In addition, the processor 2200 may perform various image processing on the image information provided from the image sensor 1000.

Figure 25:
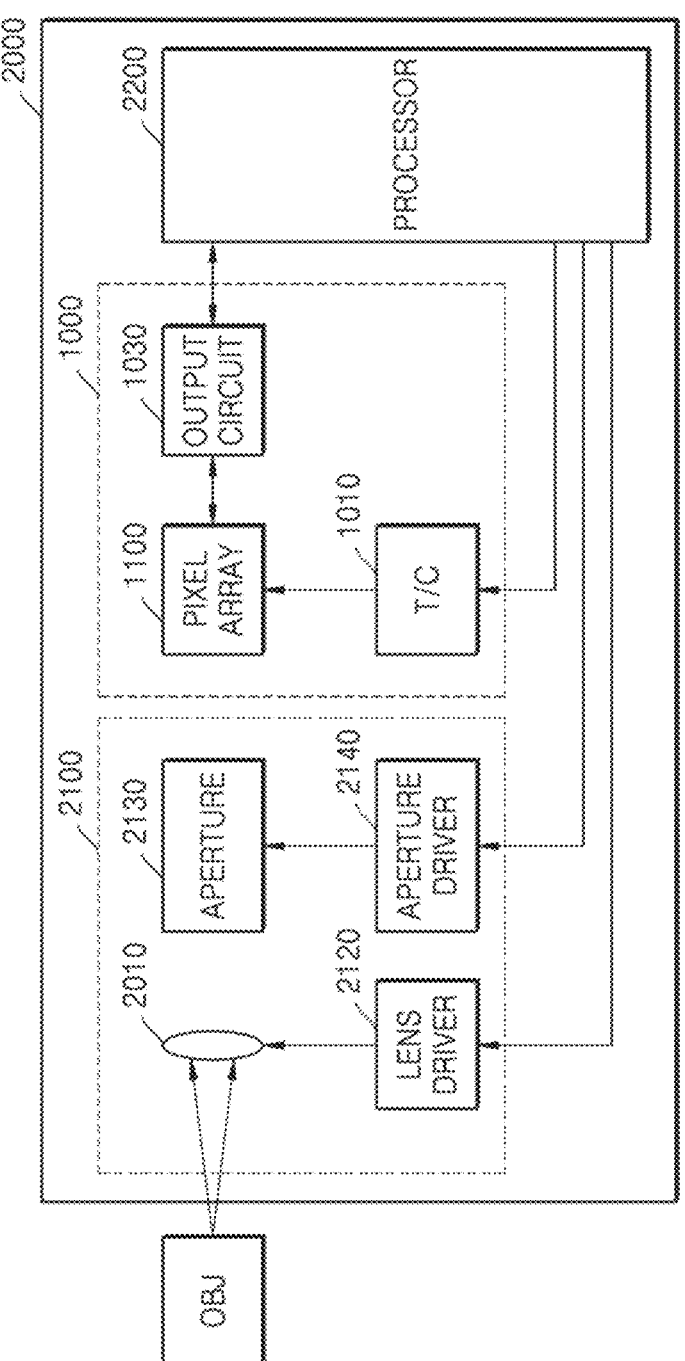
FIG. 25 is a block diagram illustrating a camera including an image sensor according to an embodiment.

FIG. 25 is a block diagram illustrating a camera 2000 including the image sensor 1000 according to an embodiment.

Referring to FIG. 25, the camera 2000 may include an imaging unit 2100, the image sensor 1000, and the processor 2200.

The imaging unit 2100 forms an optical image by condensing light reflected from an object OBJ. The imaging unit 2100 may include an objective lens 2010, a lens driver 2120, an aperture 2130, and an aperture driver 2140. For convenience, only one lens is representatively shown in FIG. 25, but the objective lens 2010 may actually include a plurality of lenses having different sizes and shapes. The lens driver 2120 may communicate information about focus detection with the processor 2200 and may adjust the position of the objective lens 2010 according to a control signal provided from the processor 2200. The lens driver 1120 may move the objective lens 2010 to adjust the distance between the objective lens 2010 and the object OBJ, or may adjust the positions of individual lenses within the objective lens 2010. The lens driving unit 2120 may drive the objective lens 2010 so that the focus on the subject OBJ may be adjusted. The camera 2000 may have an autofocus function.

The aperture driver 2140 may communicate information about the amount of light with the processor 2200 and may adjust the aperture 2130 according to the control signal provided from the processor 2200. For example, the aperture driver 2140 may increase or decrease the diameter of the aperture 2130 according to the amount of light entering the camera 2000 through the objective lens 2010 and may adjust the opening time of the aperture 2130.

The image sensor 1000 may generate an electrical image signal based on the intensity of incident light. The image sensor 1000 may include a pixel array 1100, a timing controller 1010, and an output circuit 1030. Although not shown in FIG. 25, the image sensor 1000 may further include the row decoder shown in FIG. 1. Light passing through the objective lens 2010 and the aperture 2130 may form an image of the object OBJ on a light receiving surface of the pixel array 1100. The pixel array 1100 may be a CCD or CMOS that converts an optical signal into an electrical signal. The pixel array 1100 may include additional pixels to perform an auto focus function or a distance measurement function. In addition, the pixel array 1100 may include the color separating lens array described above. As described above, the color separating lens array included in the image sensor 1000 may include one or more corresponding nano-posts having different cross-sectional areas to reduce or prevent a difference in intensity between the intensity of a first green pixel signal and the intensity of a second green pixel signal.

The processor 2200 may control overall operations of the camera 2000 and may have an image processing function. For example, the processor 2200 may provide control signals for operations of respective components to the lens driver 2120, the aperture driver 2140, and the timing controller 1010.

At least one of the devices, units, components, modules, units, or the like represented by a block or an equivalent indication in the above embodiments including, but not limited to, FIGS. 1, 3, 24 and 25, may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein).

Each of the embodiments provided in the above description is not excluded from being associated with one or more features of another example or another embodiment also provided herein or not provided herein but consistent with the disclosure.

While the disclosure has been particularly shown and described with reference to embodiments thereof, it will be understood that various changes in form and details may be made therein without departing from the spirit and scope of the following claims.

What is claimed is:

1. An image sensor comprising:
   a sensor substrate comprising a plurality of first photosensitive cells configured to sense light; and
   a color separating lens array in an upper portion of the sensor substrate and comprising a plurality of first sub regions respectively corresponding to the plurality of first photosensitive cells,
   wherein each of the plurality of first sub regions comprises a first plurality of nano-posts,
   wherein the plurality of first photosensitive cells are configured to sense a same color light,
   wherein, among the plurality of first sub regions, at least one first central sub region is positioned closer to a center of the color separating lens array than at least one first peripheral sub region is positioned,
   wherein the at least one first central sub region and the at least one first peripheral sub region are included in different unit regions of the color separating lens array,
   wherein at least one first nano-post in the at least one first central sub region and at least one second nano-post in the at least one first peripheral sub region are positioned at the same relative position within their respective first sub regions, and
   wherein a cross-sectional area of the at least one first nano-post is different from a cross-sectional area of the at least one second nano-post.

2. The image sensor of claim 1, wherein a cross-sectional area of third nano-posts that are in each of the at least one first peripheral sub region and that correspond to the at least one first nano-post decreases as the third nano-posts are positioned further from the center of the color separating lens array.

3. The image sensor of claim 1, wherein a cross-sectional area of fourth nano-posts that are in each of the at least one first peripheral sub region and that correspond to the at least one first nano-post increases as the fourth nano-posts are positioned further from the center of the color separating lens array.

4. The image sensor of claim 1, wherein the at least one second nano-post are shifted toward the center of the color separating lens array with respect to position of first photosensitive cells corresponding to the at least one first peripheral sub region.

5. The image sensor of claim 1, wherein the plurality of first photosensitive cells are configured to sense green light,
   wherein the sensor substrate further comprises a plurality of second photosensitive cells configured to sense red light, a plurality of third photosensitive cells configured to sense blue light, and plurality of fourth photosensitive cells configured to sense the green light,
   wherein the color separating lens array further comprises:
   a plurality of second sub regions respectively corresponding to the plurality of second photosensitive cells;
   a plurality of third sub regions respectively corresponding to the plurality of third photosensitive cells; and
   a plurality of fourth sub regions respectively corresponding to the plurality of fourth photosensitive cells,
   wherein the plurality of first sub regions, the plurality of second sub regions, the plurality of third sub regions, and the plurality of fourth sub regions are provided in a pattern such that one first sub region of the plurality of first sub regions, one second sub region of the plurality of second sub regions, one third sub region of the plurality of third sub regions, and one fourth sub region of the plurality of fourth sub regions are arranged adjacently in a 2×2 shape,
   wherein the plurality of second sub regions comprise a second plurality of nano-posts,
   wherein the plurality of third sub regions comprise a third plurality of nano-posts,
   wherein the plurality of fourth sub regions comprise a fourth plurality of nano-posts, and
   wherein the first plurality of nano-posts, the second plurality of nano-posts, the third plurality of nano-posts, and the fourth plurality of nano-posts respectively in each of the one first sub region, the one second sub region, the one third sub region, and the one fourth sub region and that are arranged adjacently in a 2×2 shape differ from each other in at least one of a number, an arrangement pattern, a size, and a shape.

6. The image sensor of claim 5, further comprising a color filter between the sensor substrate and the color separating lens array, the color filter comprising:
   a plurality of first filter regions respectively corresponding to the plurality of first photosensitive cells;
   a plurality of second filter regions respectively corresponding to the plurality of second photosensitive cells;
   a plurality of third filter regions respectively corresponding to the plurality of third photosensitive cells; and
   a plurality of fourth filter regions respectively corresponding to the plurality of fourth photosensitive cells,
   wherein the plurality of first filter regions, the plurality of second filter regions, the plurality of third filter regions, and the plurality of fourth filter regions are provided in a pattern in which one first filter region of the plurality of first filter regions, one second filter region of the plurality of second filter regions, one third filter region of the plurality of third filter regions, and one fourth filter region of the plurality of fourth filter regions are arranged adjacently in a 2×2 shape, and
   wherein an area of the one first filter region differs from at least one of an area of the one second filter region, an area of the one third filter region, and an area of the one fourth filter region which are arranged adjacently.

7. The image sensor of claim 6, wherein at least one area of the plurality of first filter regions, the plurality of second filter regions, the plurality of third filter regions, and the plurality of fourth filter regions at a center of the color filter is different from at least one area of the plurality of first filter regions, the plurality of second filter regions, the plurality of third filter regions, and the plurality of fourth filter regions at a periphery of the color filter.

8. The image sensor of claim 7, wherein the color filter further comprises a plurality of unit filter regions, wherein each of the plurality of unit filter regions comprises one first filter region, one second filter region, one third filter region, and one fourth filter region which are arranged adjacently, and wherein an area of at least one of the one first filter region, the one second filter region, the one third filter region, and the one fourth filter region of each of the plurality of unit filter regions is inversely proportional to a distance from the center of the color filter.

9. The image sensor of claim 7, wherein the color filter comprises a plurality of unit filter regions, wherein each of the plurality of unit filter regions comprises one first filter region, one second filter region, one third filter region, and one fourth filter region which are arranged adjacently, and wherein an area of at least one of the one first filter region, the one second filter region, the one third filter region, and the one fourth filter region of each of the plurality of unit filter regions is proportional to a distance from the center of the color filter.

10. An image sensor comprising:

a sensor substrate comprising a plurality of photosensitive cells configured to sense light; and a color separating lens array in an upper portion of the sensor substrate and comprising a plurality of unit regions, wherein the plurality of unit regions comprise a first plurality of nano-posts, wherein, among the plurality of unit regions, at least one central unit region is positioned closer to a center of the color separating lens array than at least one peripheral unit region is positioned, wherein the first plurality of nano-posts comprise at least two first nano-posts in the at least one central unit region and at least two second nano-posts in the at least one peripheral unit region, wherein the at least two first nano-posts and the at least two second nano-posts are positioned at the same relative positions within their respective unit regions, and wherein distances between the at least two first nano-posts are different from distances between the at least two second nano-posts.

11. The image sensor of claim 10, wherein distances between third nano-posts in each of the at least one peripheral unit region and corresponding to the at least two first nano-posts decrease as the third nano-posts in each of the at least one peripheral unit region are positioned further from the center of the color separating lens array.

12. The image sensor of claim 10, wherein distances between fourth nano-posts in each of the at least one peripheral unit region and corresponding to the at least two first nano-posts increase as the fourth nano-posts in each of the at least one peripheral unit region are positioned further from the center of the color separating lens array.

13. The image sensor of claim 10, wherein a cross-sectional area of at least one fifth nano-post in the at least one peripheral unit region is different from a cross-sectional area of a sixth nano-post in the at least one central unit region that corresponds to the at least one fifth nano-post.

14. The image sensor of claim 13, wherein the nano-posts in each of the at least one peripheral unit region correspond to the nano-post included in the central unit region, cross-sectional areas of the nano-posts in each of the at least one peripheral unit region decrease as the nano-posts in each of the at least one peripheral unit region are positioned further from the center of the color separating lens array.

15. The image sensor of claim 13, wherein the nano-posts in each of the at least one peripheral unit region correspond to the nano-post included in the central unit region, cross-sectional areas of the nano-posts in each of the at least one peripheral unit region increase as the nano-posts in each of the at least one peripheral unit region are positioned further from the center of the color separating lens array.

16. The image sensor of claim 10, wherein the sensor substrate further comprises:

a plurality of first photosensitive cells configured to sense green light;

a plurality of second photosensitive cells configured to sense red light;

a plurality of third photosensitive cells configured to sense blue light; and a plurality of fourth photosensitive cells configured to sense the green light, wherein each of the plurality of unit regions comprises a first sub region corresponding to a first photosensitive cell, a second sub region corresponding to a second photosensitive cell, a third sub region corresponding to a third photosensitive cell, and a fourth sub region corresponding to a fourth photosensitive cell, wherein the image sensor further comprises a color filter comprising a plurality of unit filter regions respectively corresponding to the plurality of unit regions, wherein each of the plurality of unit filter regions comprises a first filter region corresponding to a first photosensitive cell, a second filter region corresponding to a second photosensitive cell, a third filter region corresponding to a third photosensitive cell, and a fourth filter region corresponding to a fourth photosensitive cell, and wherein an area of the first filter region included in at least one unit filter region of the plurality of unit filter regions is different from an area of at least one of the second filter region, the third filter region, and the fourth filter region included in the at least one unit filter region.

17. An image sensor comprising:

a sensor substrate comprising a plurality of photosensitive cells configured to sense light; and a color separating lens array in an upper portion of the sensor substrate and comprising a plurality of unit regions, wherein each of the plurality of unit regions comprises M nano-posts, wherein, among the plurality of unit regions, at least one central unit region is positioned closer to a center of the color separating lens array than at least one peripheral unit region is positioned, wherein the M nano-posts comprise first N nano-posts in the at least one central unit region and second N nano-posts in the at least one peripheral unit region, wherein the first N nano-posts and the second N nano-posts are positioned at the same relative positions within their respective unit regions, wherein a cross-sectional area of each of the first N nano-posts is different from a cross-sectional area of each of the second N nano-posts, wherein distances between at least two first nano-posts in the at least one peripheral unit region are different from distances between two second nano-posts in the at least one central unit region that are positioned at the same relative positions within their respective unit regions, wherein M is an integer of 1 or more, and wherein Nis an integer of 1 or more and M or less.

18. The image sensor of claim 17, wherein the sensor substrate further comprises:

a plurality of first photosensitive cells configured to sense green light;

a plurality of second photosensitive cells configured to sense red light;

a plurality of third photosensitive cells configured to sense blue light; and a plurality of fourth photosensitive cells configured to sense the green light, wherein each of the plurality of unit regions comprises a first sub region corresponding to one first photosensitive cell of the plurality of first photosensitive cells, a second sub region corresponding to one second photosensitive cell of the plurality of second photosensitive cells, a third sub region corresponding to one third photosensitive cell of the plurality of third photosensitive cells, and a fourth sub region corresponding to one fourth photosensitive cell of the plurality of fourth photosensitive cells, wherein a cross-sectional area ratio of two first nano-posts corresponding to each other and included in each of a first sub region and a fourth sub region included in the at least one central unit region is different from a cross-sectional area ratio of two second nano-posts included in each of a first sub region and a fourth sub region included in the at least one peripheral unit region and respectively corresponding to the two first nano-posts.

19. The image sensor of claim 17, wherein, in a least one of the plurality of unit regions: the M nano-posts comprise a first nano-post and a second nano-post on an upper portion of the first nano-post, and wherein the second nano-post is positioned closer the center of the color separating lens array with respect to the first nano-post.

20. The image sensor of claim 17, further comprising:

a color filter comprising a plurality of unit filter regions respectively corresponding to the plurality of unit regions, wherein each of the plurality of unit regions comprises a first sub region, a second sub region, a third sub region, and a fourth sub region, wherein each of the plurality of unit filter regions includes a first filter region, a second filter region, a third filter region and a fourth filter region, and wherein an area of the first filter region included in at least one unit filter region of the plurality of unit filter regions is different from an area of at least one of the second filter region, the third filter region, and the fourth filter region included in the at least one unit filter region.

* * * * *